(12) United States Patent
Park

(10) Patent No.: US 10,397,955 B2
(45) Date of Patent: Aug. 27, 2019

(54) UPLINK PPDU TRANSMISSION

(71) Applicant: FRONTSIDE, Seongnam (KR)

(72) Inventor: Jong Hoon Park, Namyangju (KR)

(73) Assignee: FRONTSIDE, Seongnam (KR)

( * ) Notice: Subject to any disclaimer, the term of this patent is extended or adjusted under 35 U.S.C. 154(b) by 0 days.

(21) Appl. No.: 15/643,388

(22) Filed: Jul. 6, 2017

(65) Prior Publication Data

US 2018/0014327 A1 Jan. 11, 2018

(30) Foreign Application Priority Data

| Jul. 6, 2016 | (KR) | 10-2016-0085755 |
| Jul. 19, 2016 | (KR) | 10-2016-0091106 |
| Sep. 22, 2016 | (KR) | 10-2016-0121238 |
| Dec. 5, 2016 | (KR) | 10-2016-0164123 |

(51) Int. Cl.
| H04W 74/08 | (2009.01) |
| H04L 29/08 | (2006.01) |
| H04W 74/00 | (2009.01) |
| H04L 29/06 | (2006.01) |
| H04W 84/12 | (2009.01) |

(52) U.S. Cl.
CPC ......... *H04W 74/0808* (2013.01); *H04L 69/22* (2013.01); *H04L 69/323* (2013.01); *H04W 74/002* (2013.01); *H04W 74/006* (2013.01); *H04W 84/12* (2013.01)

(58) Field of Classification Search
CPC ... H04W 84/12; H04W 74/08; H04W 74/006; H04W 74/002; H04W 74/0808; H04L 69/22; H04L 69/323
USPC .......................................................... 370/338
See application file for complete search history.

(56) References Cited

U.S. PATENT DOCUMENTS

| 2014/0233551 A1* | 8/2014 | Wentink ................ H04L 1/1621 370/338 |
| 2016/0128057 A1* | 5/2016 | Seok ..................... H04L 5/0055 370/329 |
| 2016/0242177 A1* | 8/2016 | Seok ................. H04W 72/0446 |
| 2017/0033965 A1* | 2/2017 | Trainin ..................... H04L 1/00 |
| 2017/0094685 A1* | 3/2017 | Noh .................... H04W 72/042 |
| 2017/0374681 A1* | 12/2017 | Kim ........................ H04W 74/00 |
| 2018/0249501 A1* | 8/2018 | Ko .......................... H04L 27/26 |

* cited by examiner

*Primary Examiner* — Rownak Islam

(57) ABSTRACT

Uplink transmission in a wireless local area network is provided. A station receives a trigger frame for requesting a transmission of an uplink physical layer protocol data unit (PPDU) from an access point (AP). The station determines a value of a second duration field of an uplink PPDU based on a first duration field of the trigger frame. The station transmits the uplink PPDU. The uplink PPDU does not include any frame that solicits a response frame from the AP when the value of the second duration field is set to zero.

17 Claims, 30 Drawing Sheets

FIG. 11

| Duration (111) | RA (112) | TA (113) | Common Info (114) | User Info (115) | ... | User Info | Padding (116) | FCS |

UPLINK PPDU TRANSMISSION

CROSS-REFERENCE TO RELATED APPLICATIONS

This application claims the benefit of priority of Korean Patent Application Nos. 10-2016-0085755 filed on Jun. 6, 2016, 10-2016-0091106 filed on Jun. 19, 2016, 10-2016-0121238 filed on Sep. 22, 2016 and 10-2016-0164123 filed on Dec. 5, 2016, all of which are incorporated by reference in their entirety herein.

BACKGROUND OF THE INVENTION

Field of the Invention

The present invention relates to wireless communication and, more particularly, to a method and device for uplink transmission in a wireless communication system.

Related Art

Institute of Electrical and Electronics Engineers (IEEE) 802.11 based wireless local area networks (WLANs), the most popular and successful indoor wireless solutions, have evolved as a key enabling technology to cover medium to large scale enterprises, public area hot-spots, apartment complexes, and are ubiquitous in the modern world.

High Efficiency (HE) WLAN (e.g., IEEE 802.11ax) improves a spectrum efficiency and an area throughput in a dense environment. Especially, in an indoor or an outdoor environment, a purpose of the HE WLAN is to improve a performance when a lot of access points (APs) and stations (STAs) are competing.

Since a lot of APs and STAs are competing, an improved protection mechanism to prevent a collision due to simultaneous transmissions of STAs is required.

SUMMARY OF THE INVENTION

The present invention provides a method and device for uplink transmission in a wireless local area network.

In an aspect, a method for uplink transmission in a wireless local area network includes establishing, by a station, a connection with an access point (AP), receiving, by the station, information about a first basic service set (BSS) color identifying a BSS managed by the AP, receiving, by the station, a first physical layer protocol data unit (PPDU), the first PPDU including a second BSS color, comparing, by the station, the first BSS color and the second BSS color to determine whether or not the received first PPDU is from the AP, when the second BSS color matches with the first BSS color and the first PPDU is a request PPDU for requesting a transmission of a PPDU, determining, by the station, a value of a second duration field based on a first duration field of the first PPDU, transmitting, by the station, a second PPDU to the AP as a response to the first PPDU, the second PPDU including the second duration field. The first duration field of the first PPDU indicates an estimated time required to transmit the second PPDU. The second PPDU does not include any frame that solicits a response frame from the AP when the value of the second duration field is set to zero.

The second PPDU may include zero or more frame that solicits a response frame from the AP when the value of the second duration field is not set to zero.

The method may further include, when the second BSS color does not match with the first BSS color, updating, by the station, a network allocation vector (NAV) at an end of the first PPDU.

In another aspect, a device for uplink transmission in a wireless local area network is provided. The device includes a transceiver configured to receive and transmit radio signals, and a processor coupled with the transceiver. The processor is configured to control the transceiver to establish a connection with an access point (AP), control the transceiver to receive information about a first basic service set (BSS) color identifying a BSS managed by the AP, control the transceiver to receive a first physical layer protocol data unit (PPDU), the first PPDU including a second BSS color, compare the first BSS color and the second BSS color to determine whether or not the received first PPDU is from the AP, when the second BSS color matches with the first BSS color and the first PPDU is a request PPDU for requesting a transmission of a PPDU, determine a value of a second duration field based on a first duration field of the first PPDU, control the transceiver to transmit a second PPDU to the AP as a response to the first PPDU, the second PPDU including the second duration field.

In still another aspect, a method for uplink transmission in a wireless local area network includes receiving, by a station, a trigger frame for requesting a transmission of an uplink physical layer protocol data unit (PPDU) from an access point (AP), the trigger frame including a resource unit allocation and a first duration field, the resource unit allocation indicating at least one resource unit used for the transmission of the uplink PPDU, the first duration field indicating an estimated time required to transmit the uplink PPDU, determining, by the station, a value of a second duration field based on the first duration field, and transmitting, by the station, the uplink PPDU to the AP, the uplink PPDU including the second duration field. The uplink PPDU does not include any frame that solicits a response frame from the AP when the value of the second duration field is set to zero.

BRIEF DESCRIPTION OF THE DRAWINGS

FIG. 11 shows a format of Trigger frame.

DESCRIPTION OF EXEMPLARY EMBODIMENTS

Figure 1:
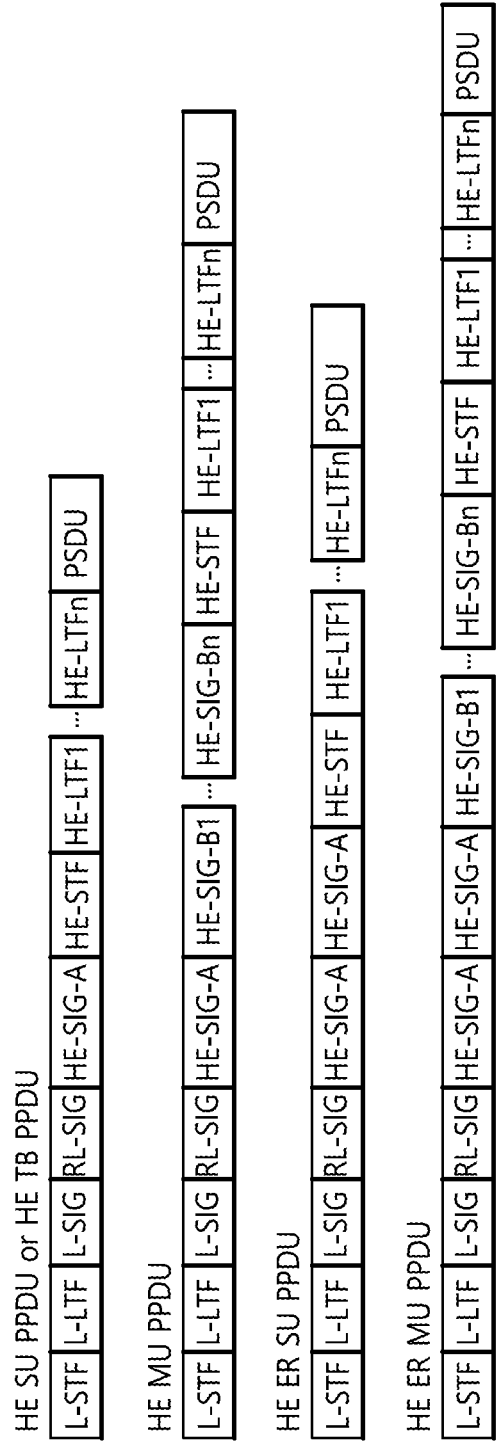
FIG. 1 shows various formats for HE PPDU.

The proposed wireless local area network (WLAN) system may operate at a band less than or equal to 6 GHz or at a band of 60 GHz. The operating band less than or equal to 6 GHz may include at least one of 2.4 GHz and 5 GHz.

For clarity, a system complying with the Institute of Electrical and Electronics Engineers (IEEE) 802.11 a/g standard is referred to as a non-High Throughput (non-HT) system, a system complying with the IEEE 802.11n standard is referred to as a High Throughput (HT) system, and a system complying with IEEE 802.11ac standard is referred to as a Very High Throughput (VHT) system. In comparison thereto, a WLAN system complying with the proposed method is referred to as a High Efficiency (HE) system. A WLAN system supporting systems used before the HE system is released is referred to as a legacy system. The HE system may include an HE Station (STA) and an HE Access Point (AP). The term HE is only for the purpose of distinguishing from the conventional WLAN, and there is no restriction thereon. The HE system may support IEEE 802.11/a/g/n/ac by providing backward compatibility in addition to the proposed method.

Unless a function of a station (STA) is additionally distinguished from a function of an Access Point (AP), the STA may include a non-AP STA and/or the AP. When it is described as an STA-to-AP communication, the STA may be expressed as the non-AP STA, and may correspond to communication between the non-AP STA and the AP. When it is described as STA-to-STA communication or when a function of the AP is not additionally required, the STA may be the non-AP STA or the AP.

A Physical layer Protocol Data unit (PPDU) is a data unit for data transmission. A basic service set (BSS) may include a set of STAs that have successfully synchronized with an AP. A basic service set identifier (BSSID) is a 48 bits identifier of a corresponding BSS. An overlapping basic service set (OBSS) may be a BSS operating on the same channel as the STA's BSS. The OBSS is one example of different BSS with the STA's BSS.

Enhanced Distributed Channel Access (EDCA) channel access protocol is derived from the Distributed Coordination Function (DCF) procedures by adding four independent enhanced distributed channel access functions (EDCAFs) to provide differentiated priorities to transmitted traffic, through the use of four different access categories (ACs).

Each EDCAF shall maintain a backoff timer, which has a value measured in backoff slots. When the backoff procedure is invoked, the backoff timer is set to an integer value chosen randomly with a uniform distribution taking values in the range [0,CW[AC]] inclusive. The duration AIFS[AC] is a duration derived from the value AIFSN[AC] by the relation: AIFS[AC]=AIFSN[AC]×aSlotTime+aSIFSTime.

In an infrastructure BSS, AIFSN[AC] is advertised by an AP in the EDCA Parameter Set element in Beacon and Probe Response frames transmitted by the AP. The value of AIFSN [AC] shall be greater than or equal to 2 for non-AP STAs. The value of AIFSN[AC] shall be greater than or equal to 1 for APs. An EDCA transmission opportunity (TXOP) which is an interval of time during which a STA has the right to initiate frame exchange sequences onto a wireless medium is granted to an EDCAF when the EDCAF determines that it shall initiate the transmission of a frame exchange sequence.

Physical and virtual Carrier sense (CS) functions are used to determine the state of the wireless medium. When either function indicates a busy medium, the medium shall be considered busy; otherwise, it shall be considered idle.

A physical CS mechanism shall be provided by the physical layer (PHY). A virtual CS mechanism shall be provided by the Medium Access Control (MAC) layer. This mechanism is referred to as the network allocation vector (NAV). The NAV maintains a prediction of future traffic on the medium based on duration information that is announced in Request-to-Send (RTS)/Clear-to-Send (CTS) frames prior to the actual exchange of data. The duration information is also available in the MAC headers of all frames sent during the contention period other than PS-Poll frames.

The CS mechanism combines the NAV state and the STA's transmitter status with physical CS to determine the busy/idle state of the medium. The NAV may be thought of as a counter, which counts down to 0 at a uniform rate. When the counter is 0, the virtual CS indication is that the medium is idle; when the counter is nonzero, the indication is busy. The medium shall be determined to be busy when the STA is transmitting.

A STA that receives at least one valid frame in a Physical layer Service Data Unit (PSDU) can update its NAV with the information from any valid Duration field in the PSDU. When the received frame's receiver address (RA) is equal to the STA's own MAC address, the STA shall not update its NAV. For all other received frames the STA shall update its NAV when the received Duration is greater than the STA's current NAV value. Upon receipt of a PS-Poll frame, a STA shall update its NAV settings as appropriate under the data rate selection rules using a duration value equal to the time, in microseconds, required to transmit one Ack frame plus one Short Interframe Space (SIFS), but only when the new NAV value is greater than the current NAV value. If the calculated duration includes a fractional microsecond, that value is rounded up to the next higher integer. Various additional conditions may set or reset the NAV. When the NAV is reset, a PHY-CCARESET.request primitive shall be issued. This NAV update operation is performed when the PHY-RXEND.indication primitive is received. The PHY- RXEND.indication primitive is an indication by the PHY to the local MAC entity that the PSDU currently being received is complete.

The PHY-RXEND.indication primitive is generated by the PHY for the local MAC entity to indicate that the receive state machine has completed a reception with or without errors. When a Signal Extension is present, the primitive is generated at the end of the Signal Extension. A RXERROR parameter of The PHY-RXEND.indication primitive provides error conditions. When the RXERROR parameter is set to 'NoError', no error occurred during the receive process in the PHY. When the RXERROR parameter is set to 'Filtered', during the reception of the PPDU, the PPDU was filtered out due to a condition set in the PHYCON-FIG_VECTOR. In the case of an RXERROR value of NoError, the MAC uses the PHY-RXEND.indication primitive as reference for channel access timing.

FIG. 1 shows various formats for HE PPDU.

HE single user (SU) PPDU, HE trigger-based (TB) PPDU and HE extended range (ER) SU PPDU format are destined for a single STA. HE multi-user (MU) PPDU and HE ER MU PPDE are destined for the plurality of STAs.

HE PPDU may include Non-HT Short Training field (L-STF), Non-HT Long Training field (L-LTF), Non-HT SIGNAL field (L-SIG), Repeated Non-HT SIGNAL field (RL-SIG), HE Signal A field (HE-SIG-A), HE Signal B field (HE-SIG-A), HE Short Training field (HE STF), HE Long Training field (HE LTF) and a Data field. The Data field may include a Physical layer service data unit (PSDU).

The L-SIG is used to communicate rate and length information. The L-SIG may include a LENGTH field and a RATE field. The RATE field may be set to the value representing 6 Mb/s in the 20 MHz channel. The LENGTH field may be set to the value given by the following equation:

$$\text{LENGTH} = \left\lceil \frac{TXTIME - 20}{4} \right\rceil \times 3 - 3 - m \quad \text{[Equation 1]}$$

where m is 1 for HE MU PPDU and HE ER SU PPDU, and m is 2 otherwise.

The HE-SIG-A may include at least one of following fields. The number of bits is exemplary purpose only.

TABLE 1

| Field | Number of bits | Description |
| --- | --- | --- |
| UL/DL | 1 | Indicates whether the PPDU is sent UL or DL: i.e. Set to 0 for DL, Set to 1 for UL |
| Format | 1 | Differentiate an HE SU PPDU from an HE TB PPDU: i.e. Set to 0 for HE TB PPDU, Set to 1 for HE SU PPDU |
| BSS Color | 6 | The BSS Color field is an identifier of the BSS |
| Bandwidth | 2 | Bandwidth over which this PPDU is transmitted. |
| Modulation and Coding Scheme (MCS) | | Indicated a MCS of the Data Field |
| TXOP Duration | | Indicates the remaining duration of the TXOP after the transmission. Set to a value to indicate duration information for NAV setting and protection of the TXOP. |
| Spatial Reuse | | Indicates whether or not spatial reuse is allowed during the transmission of this PPDU, and if allowed, indicates a value that is used to determine a limit on the transmit power of a spatial reuse transmission. |

Table 2 shows timing related constants of HE PPDU

TABLE 2

| Parameter | Values | Description |
| --- | --- | --- |
| $T_{SYM}$ | 13.6 μs, 14.4 μs or 14.4 μs depending on the GI used | Symbol interval |
| $T_{L\text{-}STF}$ | 8 μs | Non-HT Short Training field duration |
| $T_{L\text{-}LTF}$ | 8 μs | Non-HT Long Training field duration |
| $T_{L\text{-}SIG}$ | 4 μs | Non-HT SIGNAL field duration |
| $T_{RL\text{-}SIG}$ | 4 μs | Repeated non-HT SIGNAL field duration |
| $T_{HE\text{-}SIG\text{-}A}$ | 8 μs | HE Signal A field duration in normal mode |
| $T_{HE\text{-}SIG\text{-}A\text{-}R}$ | 8 μs | HE Signal A field duration in repetition/low rate mode |
| $T_{HE\text{-}STF\text{-}T}$ | 8 μs = 5 × 1.6 μs | HE Short Training field duration for trigger-based PPDU |
| $T_{HE\text{-}STF\text{-}NT}$ | 4 μs = 5 × 0.8 μs | HE Short Training field duration for non-trigger-based PPDU |
| $T_{HE\text{-}LTF}$ | $T_{HE\text{-}LTF\text{-}1X}$, $T_{HE\text{-}LTF\text{-}2X}$ or $T_{HE\text{-}LTF\text{-}4X}$ depending upon the LTF duration used | Duration of each HE-LTF symbol without GI |
| $T_{HE\text{-}LTF\text{-}1X}$ | 3.2 μs | Duration of each 1x HE-LTF symbol without GI |
| $T_{HE\text{-}LTF\text{-}2X}$ | 6.4 μs | Duration of each 2x HE-LTF symbol without GI |
| $T_{HE\text{-}LTF\text{-}4X}$ | 12.8 μs | Duration of each 4x HE-LTF symbol without GI |
| $T_{HE\text{-}SIG\text{-}B}$ | 4 μs = 3.2 μs + $T_{GI,Pre\text{-}HE}$ | Duration of each HE-SIG-B symbol |
| $T_{PE}$ | 0, 4 μs, 8 μs, 12 μs, 16 μs depending on actual extension duration used | Duration of Packet Extension field |
| $N_{service}$ | 16 | Number of bits in the SERVICE field |
| $N_{tail}$ | 6 | Number of tail bits per BCC encoder |

An HE STA updates the NAV depending on the timing of PHY_RXEND.indication primitive occurred from the received PPDU. If PHY-RXEND.indication primitive is occurred at the end of the PSDU, the NAV is set to either TXOP Duration value indicated in HE-SIG-A or Duration value indicated in MAC header. When the CRC of the MSDU is passed, the NAV is set to the Duration value indicated in MAC header. When the CRC of the MSDU is failed, the NAV is set to the TXOP Duration value indicated in HE-SIG-A.

If PHY-RXEND.indication primitive is occurred before the end of PSDU, the NAV is set to TXOP Duration value plus a remaining time until the end of PSDU. The remaining time until the end of PSDU is varied depending on the received HE PPDU Type and/or a direction of frame. Filtering out a received PPDU is happened when a STA finds out that it is not a recipient STA. That detection timing is varied depending on the received HE PPDU.

If the received signal strength is less than OBSS Packet Detection (OBSS PD) Threshold, RXVECTOR parameter TXOP_DURATION is set to 0 because a STA ignores the NAV update. A STA does not update its NAV when the received Duration is less than or equal to the STA's current NAV value.

Figure 2:
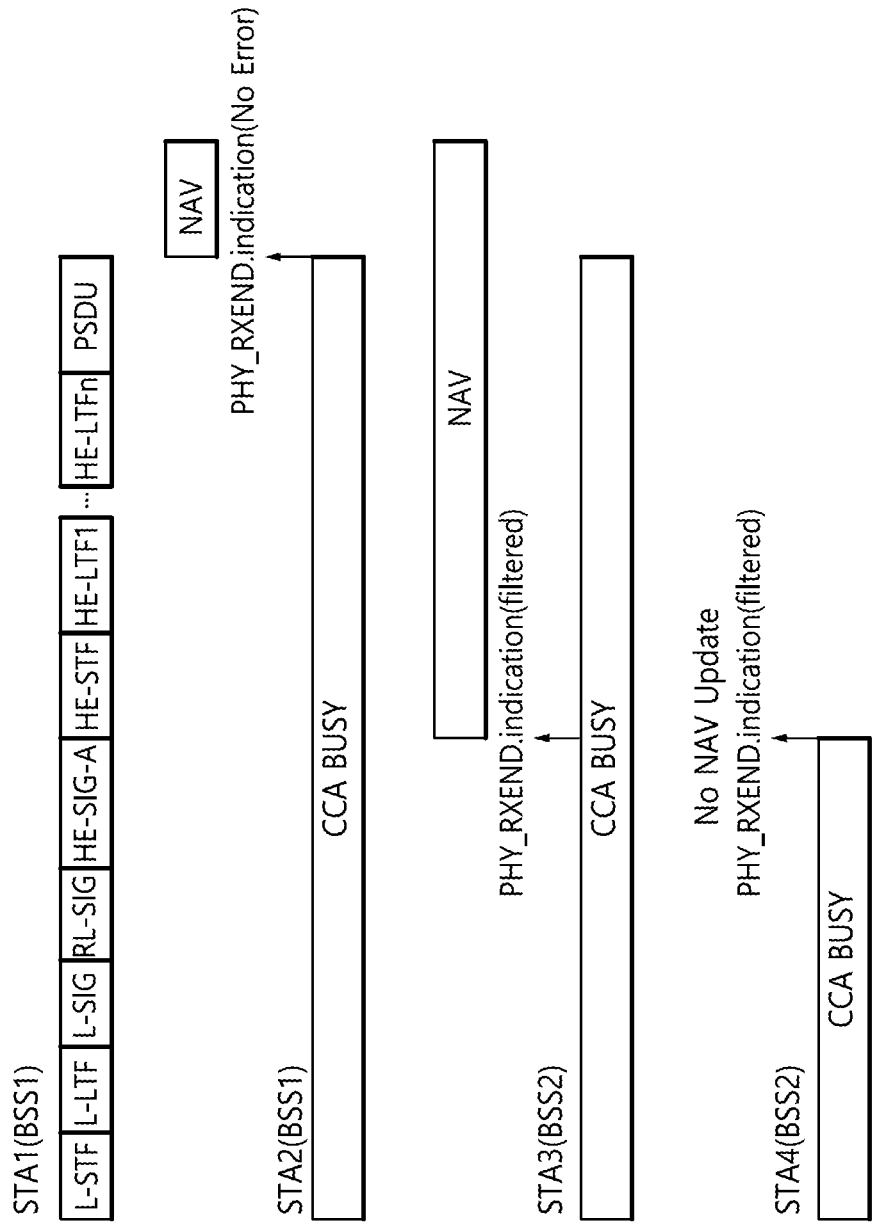
FIG. 2 shows the NAV procedure of HE STA after receiving HE SU PPDU or HE TB PPDU.

FIG. 2 shows the NAV procedure of HE STA after receiving HE SU PPDU or HE TB PPDU.

In a HE SU/TB PPDU, TXTIME in the LENGTH parameter of L-SIG is set as $$TXTIME = T_{LEG\_PREAMBLE} + T_{L-SIG} + T_{RL-SIG} + T_{HE-SIG-A} + T_{HE\_PREAMBLE} + T_{SYM} \cdot N_{SYM} + T_{PE}.$$

In a case of STA 2, because PHY-RXEND.indication primitive is occurred at the end of the PSDU, the NAV is set to either TXOP Duration value indicated in HE-SIG-A or Duration value indicated in MAC header.

In a case of STA 3, after decoding HE-SIG-A, it knows that the received PPDU is destined to OBSS STA. So, it discards the remaining PSDU. In consequence, PHY-RXEND.indication primitive is occurred after HE-SIG-A.

The NAV of STA 3 is set to TXOP Duration value plus the remaining time until the end of PSDU. The remaining time until the end of PSDU is equal to $$\left\lceil \frac{LENGTH+3+m}{3} \right\rceil 4 - T_{RL-SIG} - T_{HE-SIG-A}.$$

In a case of STA 4, after decoding HE-SIG-A, it knows that the received PPDU is destined to OBSS STA. But, because the received signal strength is less than OBSS Packet Detection (OBSS PD) Threshold, it ignores the NAV update and resumes its backoff procedure.

Figure 3:
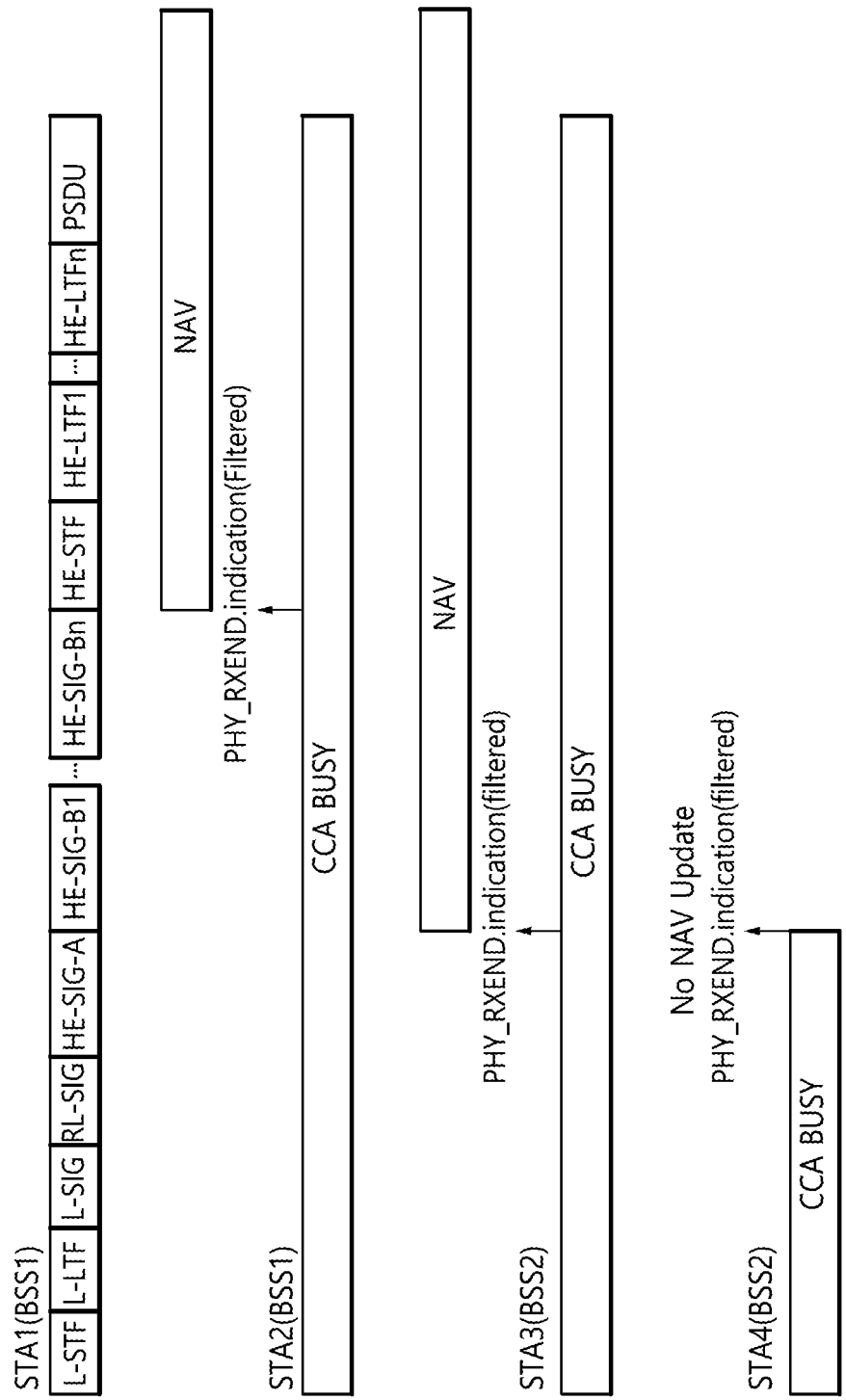
FIG. 3 shows the NAV procedure of HE STA after receiving HE MU PPDU.

FIG. 3 shows the NAV procedure of HE STA after receiving HE MU PPDU.

In a HE MU PPDU, TXTIME in the LENGTH parameter of L-SIG is set as $$TXTIME = T_{LEG\_PREAMBLE} + T_{L-SIG} + T_{RL-SIG} + T_{HE-SIG-A} + N_{HE-SIG-B} \cdot T_{HE-SIG-B} + T_{HE\_PREAMBLE} + T_{SYM} \cdot N_{SYM} + T_{PE}.$$

$N_{sym}$ is the number of symbols in the Data field.

In STA 2, after decoding HE-SIG-A, it knows that the received PPDU is destined to STAs in Intra-BSS. So, it continues to decode the following HE-SIG-B symbols. Then, because it is not a destination of the received HE MU PPDU, PHY-RXEND.indication primitive is occurred after the last symbol of HE-SIG-B.

The NAV of STA 2 is set to TXOP Duration value plus the remaining time until the end of PSDU. The remaining time until the end of PSDU is equal to $$\left\lceil \frac{LENGTH+3+m}{3} \right\rceil 4 - T_{RL-SIG} - T_{HE-SIG-A} - N_{HE-SIG-B} T_{HE-SIG-B}.$$

$N_{HE-SIG-B}$ is the number of HE-SIG-B symbols.

In a case of STA 3, after decoding HE-SIG-A, it knows that the received PPDU is destined to OBSS STA. So, it discards the remaining PSDU. In consequence, PHY-RXEND.indication primitive is occurred after HE-SIG-A.

The NAV of STA 3 is set to TXOP Duration value plus the remaining time until the end of PSDU. The remaining time until the end of PSDU is equal to $$\left\lceil \frac{LENGTH+3+m}{3} \right\rceil 4 - T_{RL-SIG} - T_{HE-SIG-A}.$$

In STA 4, after decoding HE-SIG-A, it knows that the received PPDU is destined to OBSS STA. But, because the received signal strength is less than OBSS Packet Detection (OBSS PD) Threshold, it ignores the NAV update and resumes its backoff procedure.

Figure 4:
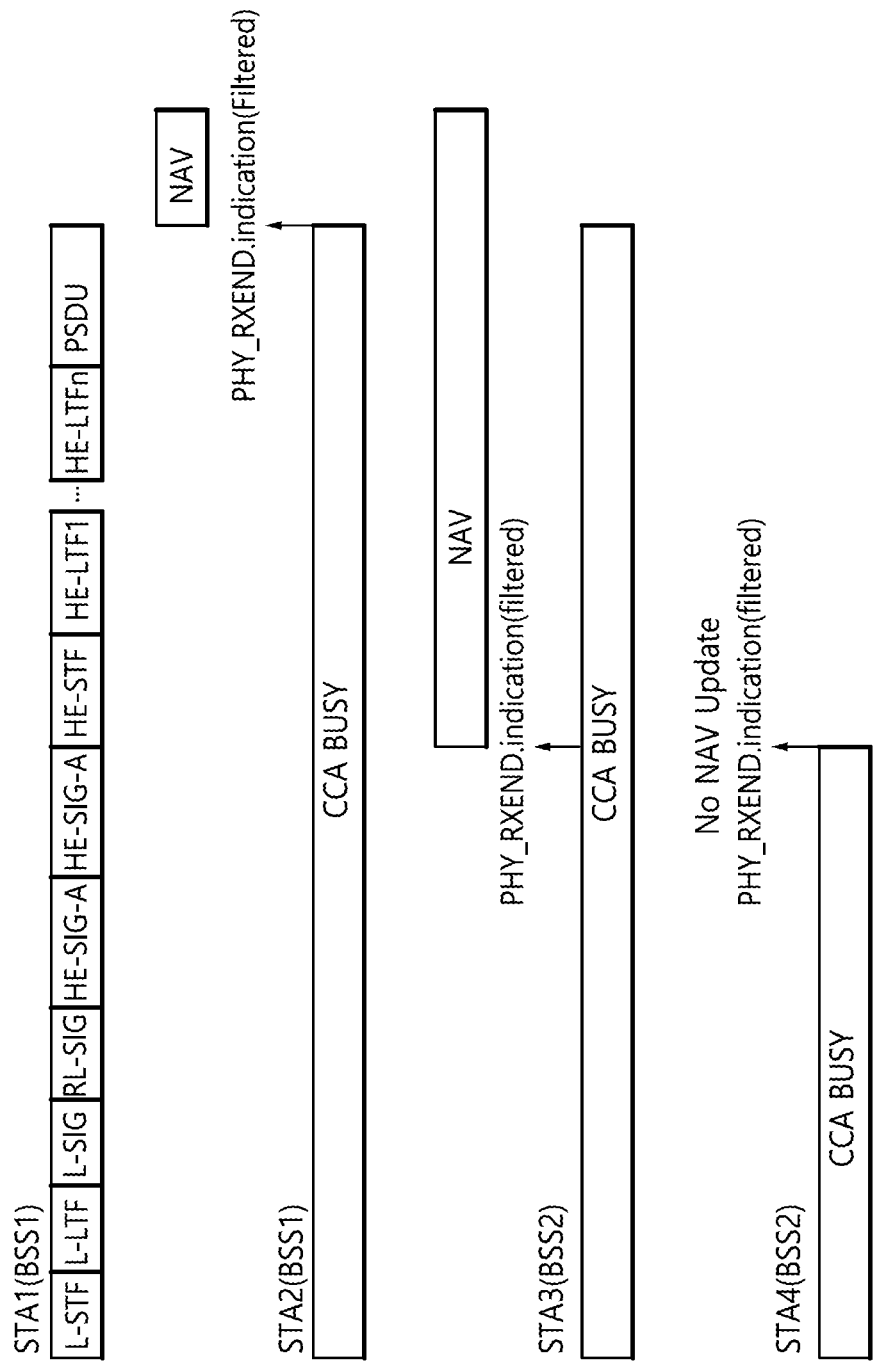
FIG. 4 shows the NAV procedure of HE STA after receiving HE ER SU PPDU.

FIG. 4 shows the NAV procedure of HE STA after receiving HE ER SU PPDU.

In a HE ER SU PPDU, TXTIME in the LENGTH parameter of L-SIG is set as $$TXTIME = T_{LEG\_PREAMBLE} + T_{L-SIG} + T_{RL-SIG} + T_{HE-SIG-A} + T_{HE-SIG-A-R} + T_{HE\_PREAMBLE} + T_{SYM} \cdot N_{SYM} + T_{PE}.$$

In STA 2, because PHY-RXEND.indication primitive is occurred at the end of the PSDU, the NAV is set to either TXOP Duration value indicated in HE-SIG-A or Duration value indicated in MAC header.

In a case of STA 3, after decoding HE-SIG-A, it knows that the received PPDU is destined to OBSS STA. So, it discards the remaining PSDU. In consequence, PHY-RXEND.indication primitive is occurred after HE-SIG-A.

The NAV of STA 3 is set to TXOP Duration value plus the remaining time until the end of PSDU. The remaining time until the end of PSDU is equal to $$\left\lceil \frac{LENGTH+3+m}{3} \right\rceil 4 - T_{RL-SIG} - T_{HE-SIG-A} - T_{HE-SIG-A-R}.$$

In STA 4, after decoding HE-SIG-A, it knows that the received PPDU is destined to OBSS STA. But, because the received signal strength is less than OBSS Packet Detection (OBSS PD) Threshold, it ignores the NAV update and resumes its backoff procedure.

Figure 5:
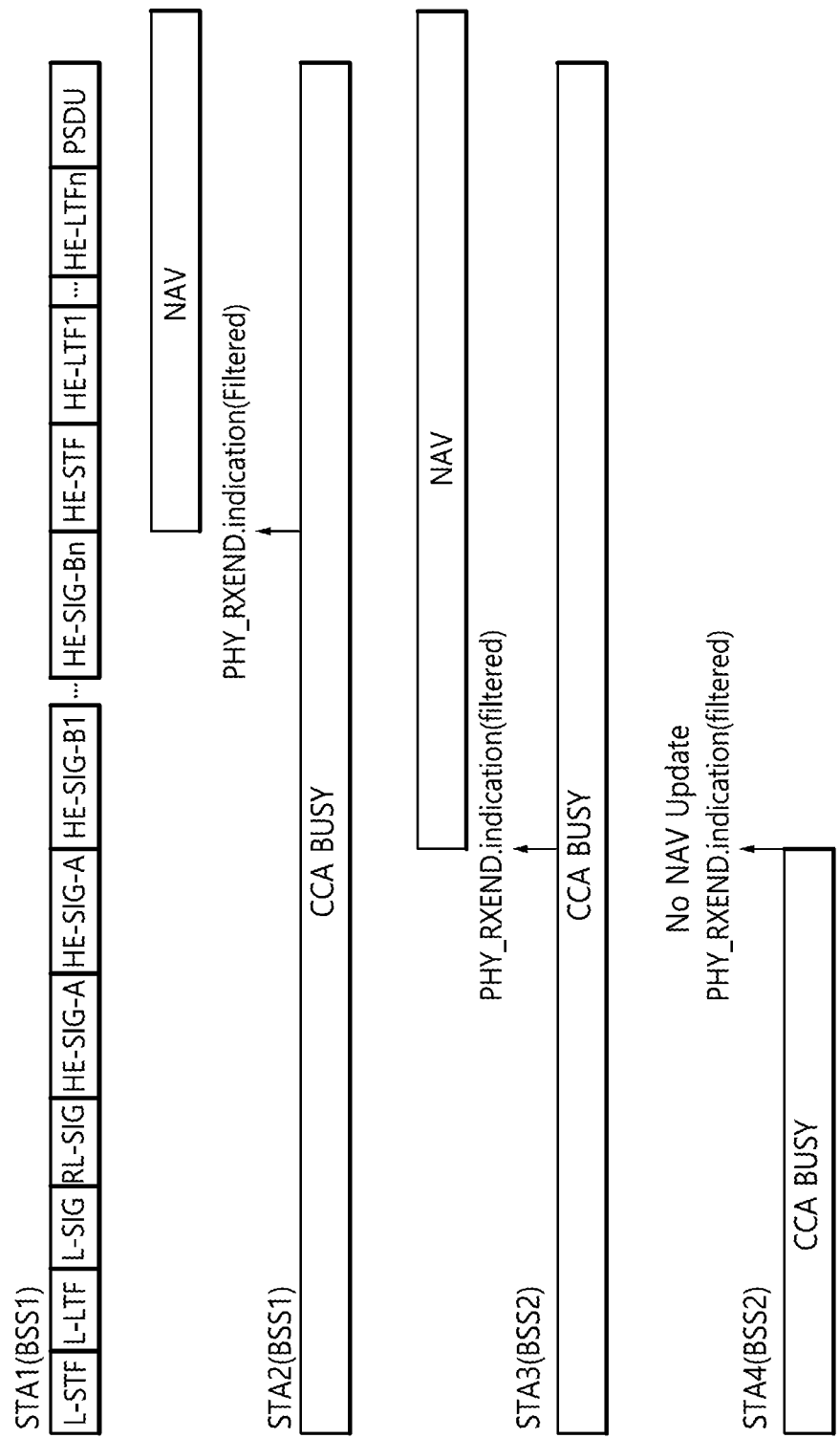
FIG. 5 shows the NAV procedure of HE STA after receiving HE ER MU PPDU.

FIG. 5 shows the NAV procedure of HE STA after receiving HE ER MU PPDU.

In a HE ER MU PPDU, TXTIME in the LENGTH parameter of L-SIG is set as $$TXTIME = T_{LEG\_PREAMBLE} + T_{L-SIG} + T_{RL-SIG} + T_{HE-SIG-A} + T_{HE-SIG-A-R} + N_{HE-SIG-B} \cdot T_{HE-SIG-B} + T_{HE\_PREAMBLE} + T_{SYM} \cdot N_{SYM} + T_{PE}.$$

In STA 2, after decoding HE-SIG-A, it knows that the received PPDU is destined to STAs in Intra-BSS. So, it continues to decode the following HE-SIG-B symbols. Then, because it is not a destination of the received HE PPDU Type 4 frame, PHY-RXEND.indication primitive is occurred after the last symbol of HE-SIG-B.

The NAV of STA 2 is set to TXOP Duration value plus the remaining time until the end of PSDU. The remaining time until the end of PSDU is equal to $$\left\lceil \frac{LENGTH+3+m}{3} \right\rceil 4 - T_{RL-SIG} - T_{HE-SIG-A} - T_{HE-SIG-A-R} - N_{HE-SIG-B} T_{HE-SIG-B}.$$

In a case of STA 3, after decoding HE-SIG-A, it knows that the received PPDU is destined to OBSS STA. So, it discards the remaining PSDU. In consequence, PHY-RX-END.indication primitive is occurred after HE-SIG-A.

The NAV of STA 3 is set to TXOP Duration value plus the remaining time until the end of PSDU. The remaining time until the end of PSDU is equal to $$\left\lceil \frac{LENGTH+3+m}{3} \right\rceil 4 - T_{RL-SIG} - T_{HE-SIG-A} - T_{HE-SIG-A-R}.$$

In STA 4, after decoding HE-SIG-A, it knows that the received PPDU is destined to OBSS STA. But, because the received signal strength is less than OBSS Packet Detection (OBSS PD) Threshold, it ignores the NAV update and resumes its backoff procedure.

According to an embodiment of the claimed invention, a STA can update its NAV when either the PHY-RXEND.indication primitive or the PHY-TXOP.indication primitive is received. A STA that receives at least one valid frame in a PSDU can update its NAV with the information from any valid Duration field in the PSDU. This NAV update operation is performed when the PHY-RXEND.indication primitive is received, except when the PHYRXEND.indication primitive is received before the end of the PPDU, in which case the NAV update is performed at the expected end of the PPDU.

It is noted that the PHY-TXOP.indication primitive may not be occurred before the PHY-RXEND.indication primitive. The PHY-TXOP.indication primitive provides the TXOP DURATION parameter which is set to a value indicated in the TXOP Duration field of HE-SIG-A from the received HE PPDU. The PHY-TXOP.indication primitive ca be generated by the PHY for the local MAC entity when a predicted duration based on RXTIME has elapsed, where $$RXTIME = \left\lceil \frac{LENGTH+3+m}{3} \right\rceil 4 + 20.$$

Figure 6:
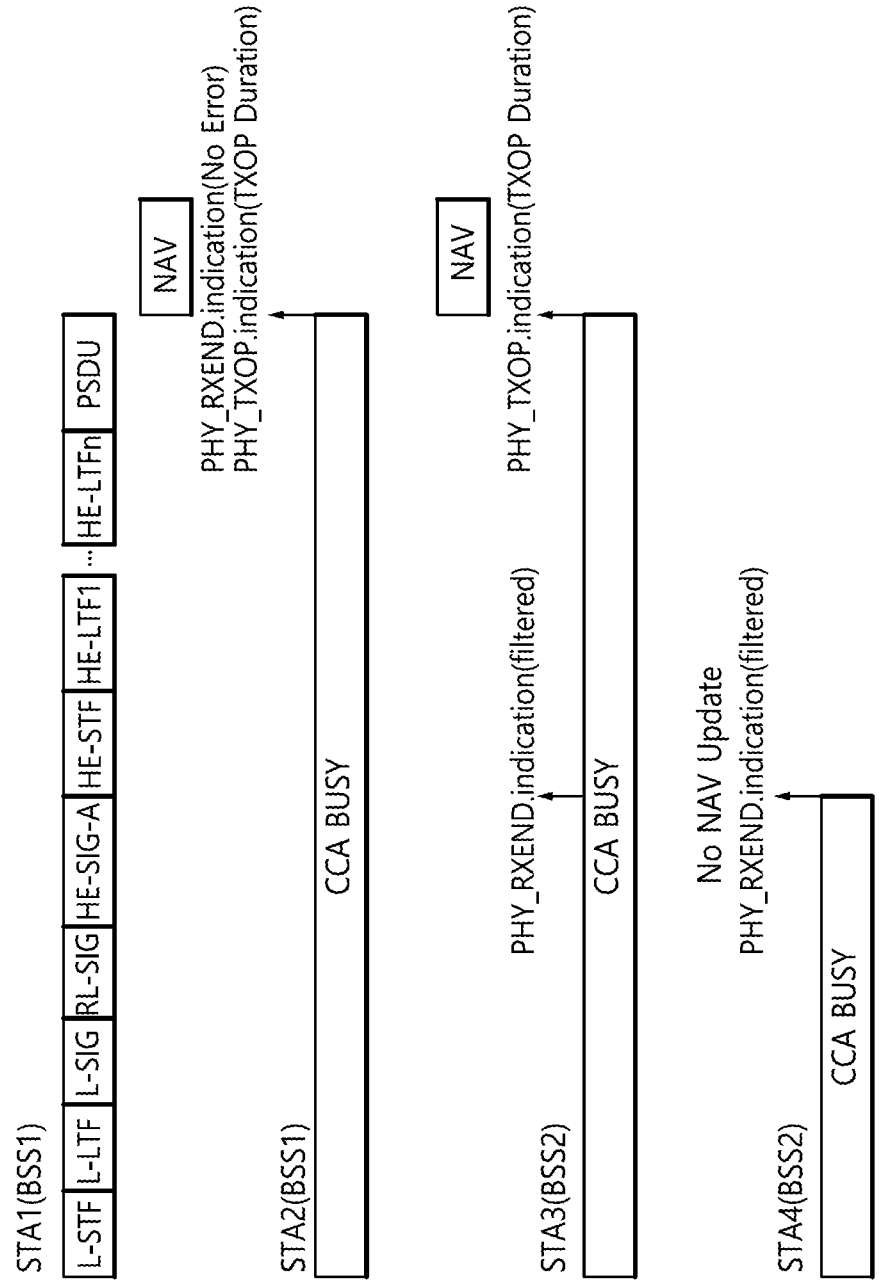
FIG. 6 shows the NAV procedure of HE STA after receiving HE SU/TB PPDU.

FIG. 6 shows the NAV procedure of HE STA after receiving HE SU/TB PPDU.

In a HE SU/TB PPDU, TXTIME in the LENGTH parameter of L-SIG is set as

TXTIME=$T_{LEG\_PREAMBLE}+T_{L-SIG}+T_{RL-SIG}+T_{HE-SIG-A}+T_{HE\_PREAMBLE}+T_{SYM} \cdot N_{SYM}+T_{PE}$.

In STA 2, because PHY-RXEND.indication primitive and PHY-TXOP.indication primitive are occurred at the end of the PSDU, the NAV is set to either TXOP Duration value indicated in HE-SIG-A or Duration value indicated in MAC header.

In a case of STA 3, after decoding HE-SIG-A, it knows that the received PPDU is destined to OBSS STA. So, it discards the remaining PSDU. In consequence, PHY-RX-END.indication primitive is occurred after HE-SIG-A for a power saving purpose. But, for a protection mechanism, PHY-TXOP.indication primitive is occurred at the end of the RXTIME.

The NAV of STA 3 is set to TXOP Duration value obtained from PHY-TXOP.indication primitive.

In STA 4, after decoding HE-SIG-A, it knows that the received PPDU is destined to OBSS STA. But, because the received signal strength is less than OBSS Packet Detection (OBSS PD) Threshold, it ignores the NAV update and resumes its backoff procedure. PHY-TXOP.indication primitive is not occurred or is occurred with RXVECTOR parameter TXOP_DURATION set to 0.

Figure 7:
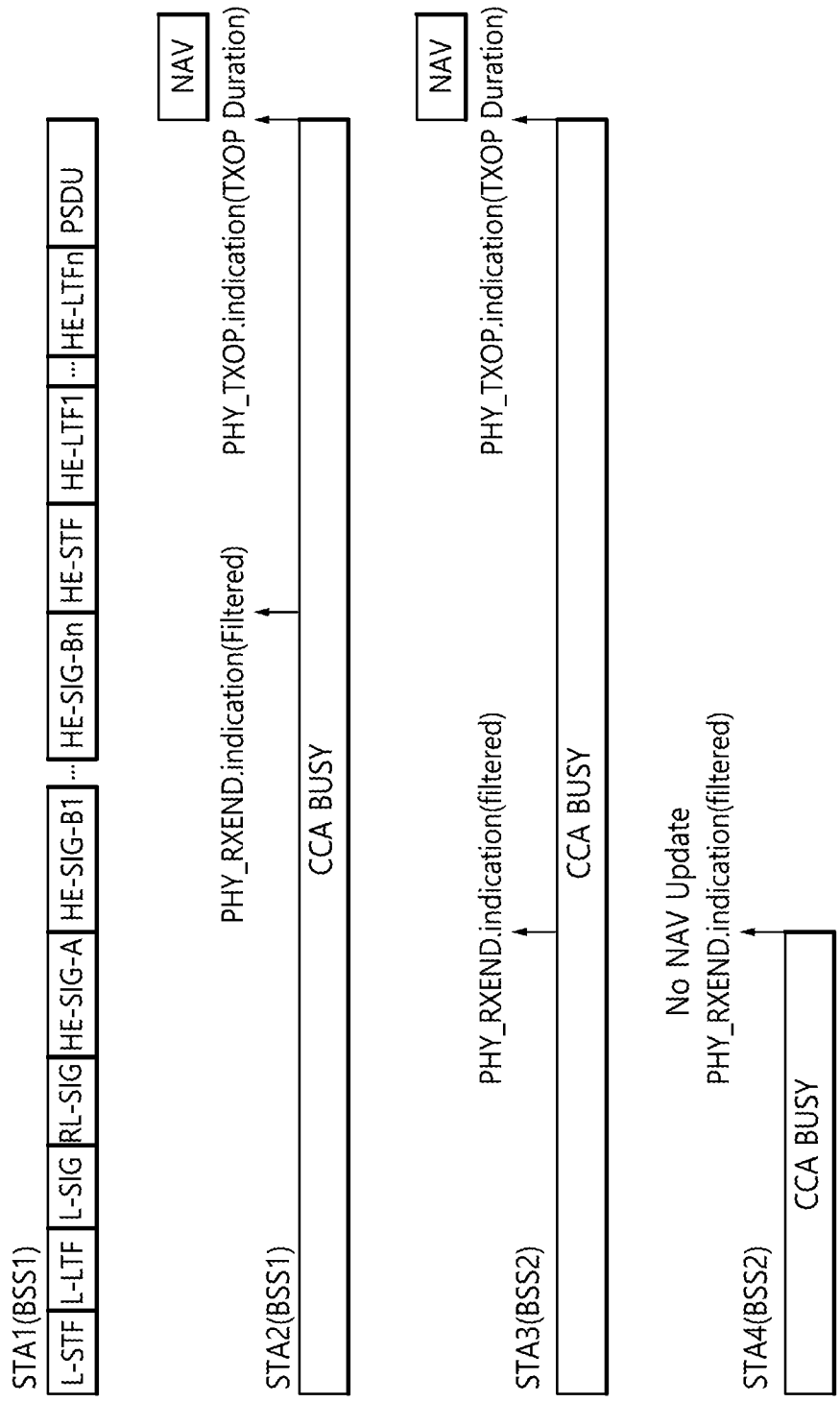
FIG. 7 shows the NAV procedure of HE STA after receiving HE MU PPDU.

FIG. 7 shows the NAV procedure of HE STA after receiving HE MU PPDU.

In a HE MU PPDU, TXTIME in the LENGTH parameter of L-SIG is set as

TXTIME=$T_{LEG\_PREAMBLE}+T_{L-SIG}+T_{RL-SIG}+T_{HE-SIG-A}+N_{HE-SIG-B} \cdot T_{HE-SIG-B}+T_{HE\_PREAMBLE}+T_{SYM} \cdot N_{SYM}+T_{PE}$.

In STA 2, after decoding HE-SIG-A, it knows that the received PPDU is destined to STAs in Intra-BSS. So, it continues to decode the following HE-SIG-B symbols. Then, because it is not a destination of the received HE PPDU Type 2 frame, PHY-RXEND.indication primitive is occurred after the last symbol of HE-SIG-B for a power saving purpose. But, for a protection mechanism, PHY-TXOP.indication primitive is occurred at the end of the RXTIME.

The NAV of STA 2 is set to TXOP Duration value obtained from PHY-TXOP.indication primitive.

In a case of STA 3, after decoding HE-SIG-A, it knows that the received PPDU is destined to OBSS STA. So, it discards the remaining PSDU. In consequence, PHY-RX-END.indication primitive is occurred after HE-SIG-A for a power saving purpose. But, for a protection mechanism, PHY-TXOP.indication primitive is occurred at the end of the RXTIME. The NAV of STA 3 may be set to TXOP Duration value obtained from PHY-TXOP.indication primitive.

In STA 4, after decoding HE-SIG-A, it knows that the received PPDU is destined to OBSS STA. But, because the received signal strength is less than OBSS Packet Detection (OBSS PD) Threshold, it ignores the NAV update and resumes its backoff procedure. PHY-TXOP.indication primitive is not occurred or is occurred with RXVECTOR parameter TXOP DURATION set to 0.

Figure 8:
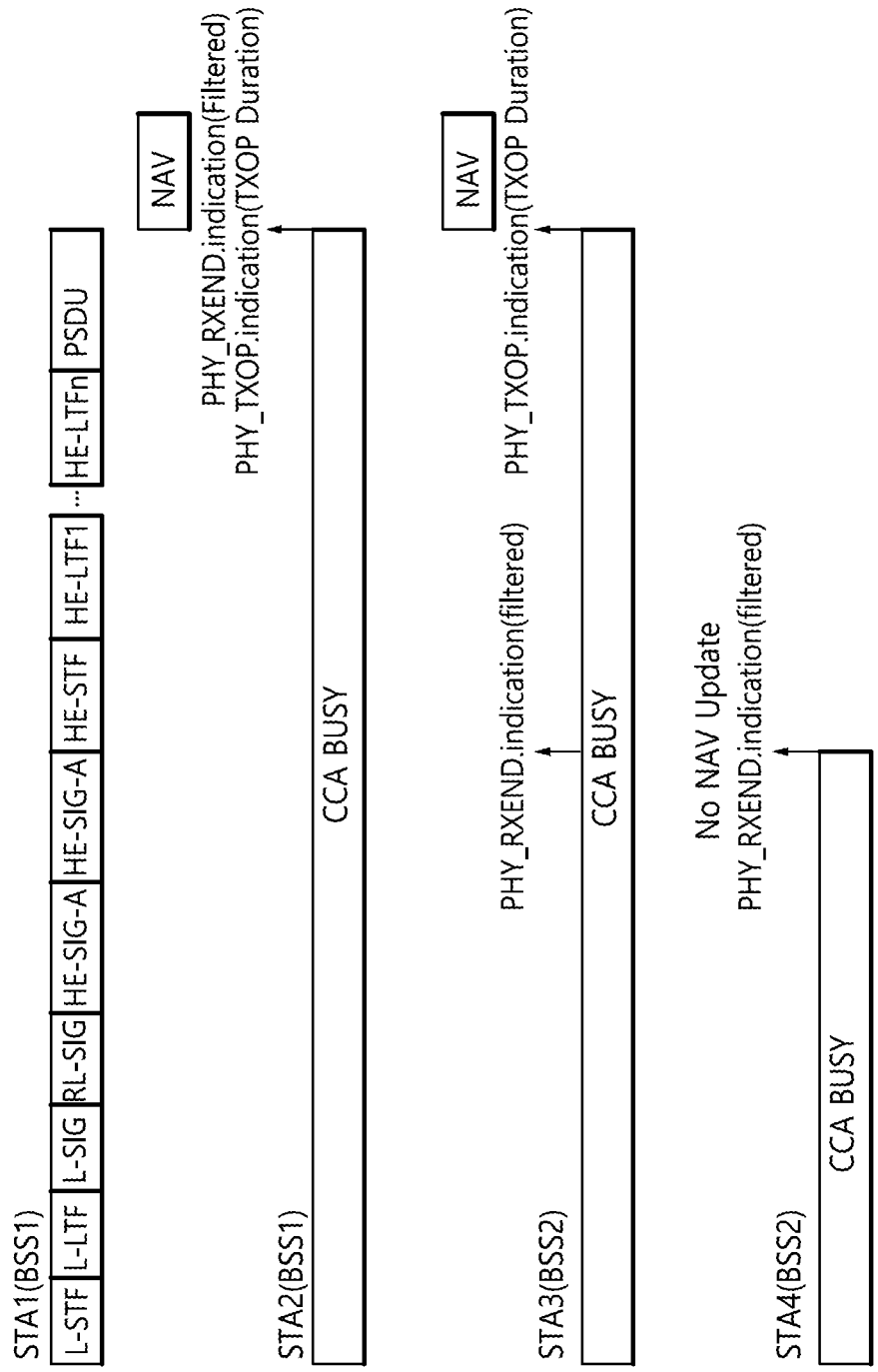
FIG. 8 shows the NAV procedure of HE STA after receiving HE ER SU PPDU.

FIG. 8 shows the NAV procedure of HE STA after receiving HE ER SU PPDU.

In a HE ER SU PPDU, TXTIME in the LENGTH parameter of L-SIG is set as

TXTIME=$T_{LEG\_PREAMBLE}+T_{L-SIG}+T_{RL-SIG}+T_{HE-SIG-A}+T_{HE-SIG-A-R}+T_{HE\_PREAMBLE}+T_{SYM} \cdot N_{SYM}+T_{PE}$.

In STA 2, because PHY-RXEND.indication primitive and PHY-TXOP.indication primitive are occurred at the end of the PSDU, the NAV is set to either TXOP Duration value indicated in HE-SIG-A or Duration value indicated in MAC header.

In a case of STA 3, after decoding HE-SIG-A, it knows that the received PPDU is destined to OBSS STA. So, it discards the remaining PSDU. In consequence, PHY-RX-END.indication primitive is occurred after HE-SIG-A for a power saving purpose. But, for a protection mechanism, PHY-TXOP.indication primitive is occurred at the end of the RXTIME. The NAV of STA 3 may be set to TXOP Duration value obtained from PHY-TXOP.indication primitive.

In STA 4, after decoding HE-SIG-A, it knows that the received PPDU is destined to OBSS STA. But, because the received signal strength is less than OBSS Packet Detection (OBSS PD) Threshold, it ignores the NAV update and resumes its backoff procedure. PHY-TXOP.indication primitive is not occurred or is occurred with RXVECTOR parameter TXOP_DURATION set to 0.

Figure 9:
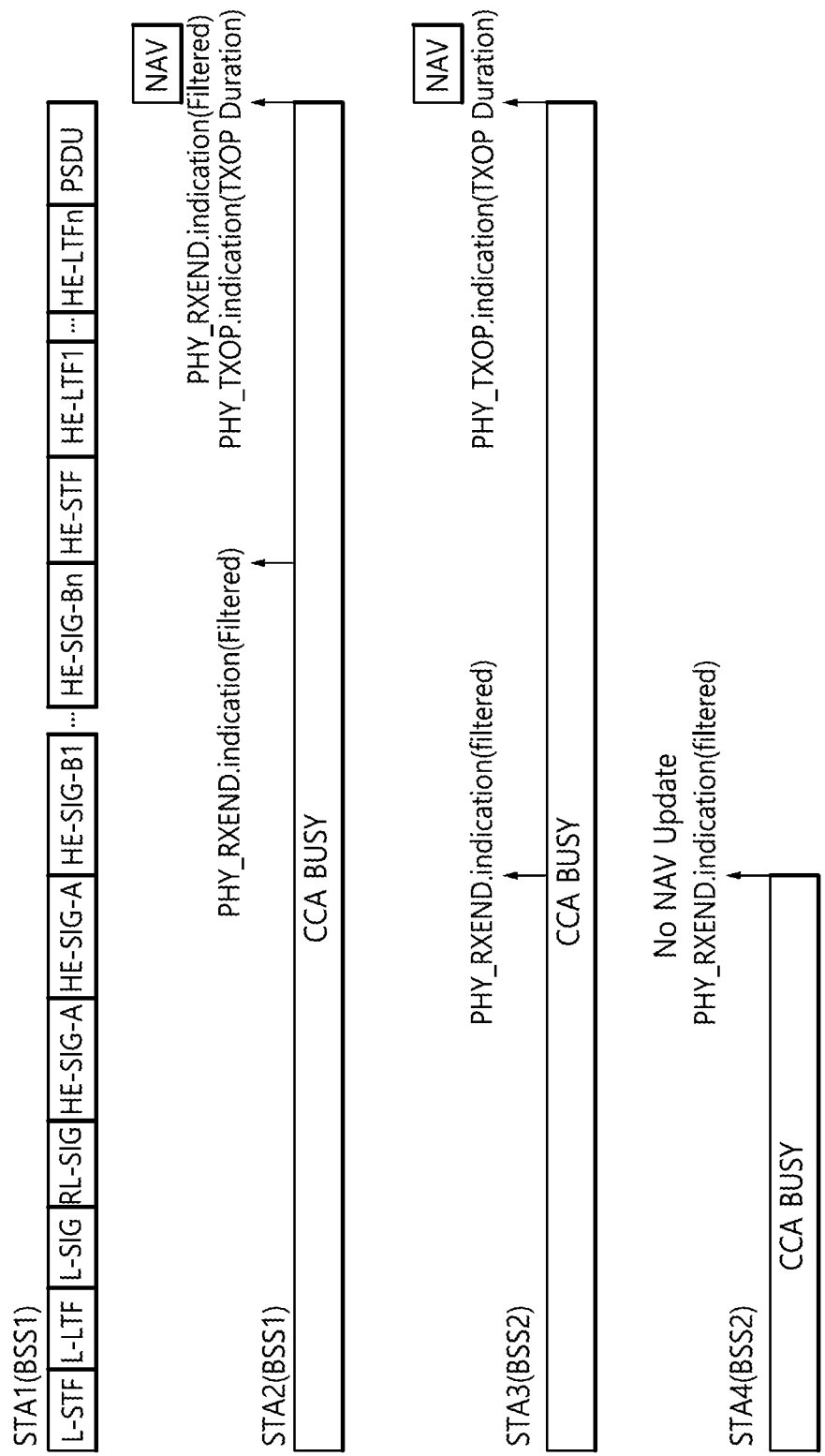
FIG. 9 shows the NAV procedure of HE STA after receiving HE ER MU PPDU.

FIG. 9 shows the NAV procedure of HE STA after receiving HE ER MU PPDU.

In a HE ER MU PPDU, TXTIME in the LENGTH parameter of L-SIG is set as $$TXTIME = T_{LEG\_PREAMBLE} + T_{L-SIG} + T_{RL-SIG} + T_{HE-SIG-A} + T_{HE-SIG-A-R} + N_{HE-SIG-B} \cdot T_{HE-SIG-B} + T_{HE\_PREAMBLE} + T_{SYM} \cdot N_{SYM} + T_{PE}.$$

In STA 2, after decoding HE-SIG-A, it knows that the received PPDU is destined to STAs in Intra-BSS. So, it continues to decode the following HE-SIG-B symbols. Then, because it is not a destination of the received HE PPDU Type 4 frame, PHY-RXEND.indication primitive is occurred after the last symbol of HE-SIG-B for a power saving purpose. But, for a protection mechanism, PHY-TXOP.indication primitive is occurred at the end of the RXTIME.

The NAV of STA 2 is set to TXOP Duration value obtained from PHY-TXOP.indication primitive.

In a case of STA 3, after decoding HE-SIG-A, it knows that the received PPDU is destined to OBSS STA. So, it discards the remaining PSDU. In consequence, PHY-RXEND.indication primitive is occurred after HE-SIG-A for a power saving purpose. But, for a protection mechanism, PHY-TXOP.indication primitive is occurred at the end of the RXTIME. The NAV of STA 3 may be set to TXOP Duration value obtained from PHY-TXOP.indication primitive.

In STA 4, after decoding HE-SIG-A, it knows that the received PPDU is destined to OBSS STA. But, because the received signal strength is less than OBSS Packet Detection (OBSS PD) Threshold, it ignores the NAV update and resumes its backoff procedure. PHY-TXOP.indication primitive is not occurred or is occurred with RXVECTOR parameter TXOP_DURATION set to 0.

Protection at Uplink (UL) Multi-User (MU) Operation

Figure 10:
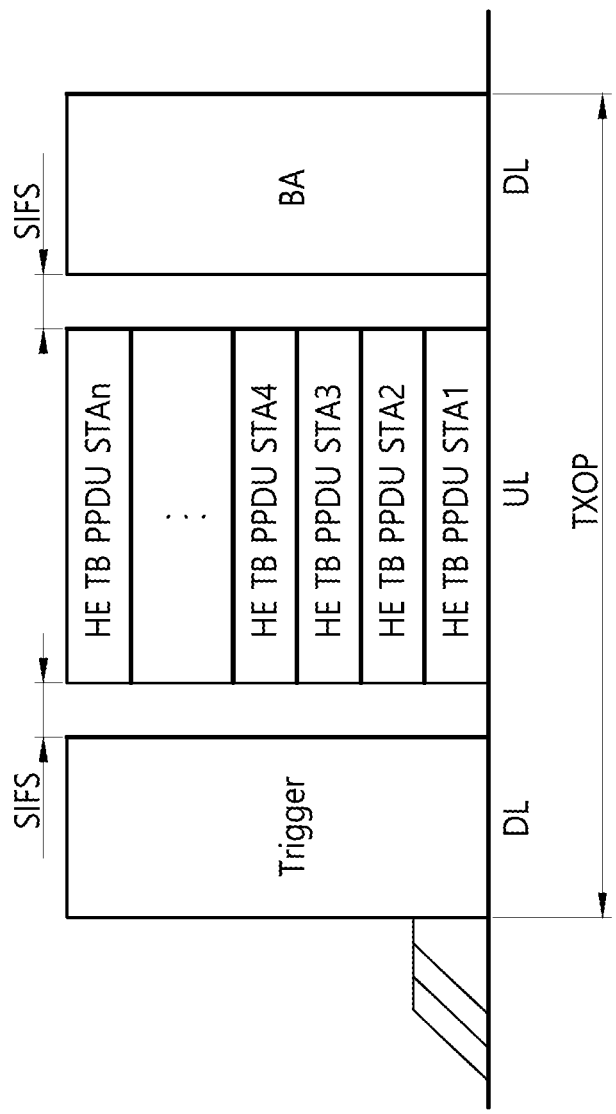
FIG. 10 shows an example of uplink multi-user operation.

FIG. 10 shows an example of uplink multi-user operation.

The UL MU operation allows an AP to solicit simultaneous immediate response frames from one or more non-AP STAs. Non-AP STAs transmit their response frames using HE TB PPDU, in either UL OFDMA, UL MU-MIMO, or both.

An AP transmits a Trigger frame to a plurality of STAs. The Trigger frame requests a transmission of HE TB PPDU. The Trigger frame solicits and allocates resources for UL MU transmissions a SIFS after the PPDU that carries the Trigger frame. The Trigger frame also carries other information required by the responding STA to send an HE TB PPDU. The trigger frame is transmitted by using a HE MU PPDU. The inter frame space between a PPDU that contains a Trigger frame and the HE TB PPDU is SIFS. If a Trigger frame is aggregated with other frames in an Aggregated-MAC Protocol Data Unit (A-MPDU), the Trigger frame shall be the first frame in the A-MPDU.

A STA may commence the transmission of an HE TB PPDU at the SIFS time boundary after the end of a received PPDU, when the received PPDU contains a Trigger frame with a User Info field addressed to the STA. The User Info field is addressed to a STA if the User Identifier subfield is equal to the association identifier (AID) of the STA and the STA is associated with the AP.

After receiving a plurality of HE TB PPDUs from the plurality of STAs, the AP may transmits a block acknowledgement (BA) frame for acknowledging the plurality of HE TB PPDUs to the plurality of STAs.

FIG. 11 shows a format of Trigger frame.

A Duration field 111 is set to the remaining duration of the TXOP. The Duration field 111 may be set to the estimated time required to transmit the solicited HE TB PPDU, plus the estimated time required to transmit the acknowledgement for the solicited HE TB PPDU, plus applicable SIFSs.

A receiver address (RA) field 112 is the address of the recipient STA. A transmitter address (TA) field 113 is the address of the STA transmitting the Trigger frame. A Padding field 116 extends the frame length to give the recipient STAs more time to prepare a response.

A Common Info field 114 may include at least one of following subfields in the Table 3.

TABLE 3

| Subfields | Bits | Description |
| --- | --- | --- |
| Trigger Type | 4 | indicates the type of the Trigger frame. |
| Length | 12 | indicates the value of the L-SIG Length field of the HE TB PPDU that is the response to the Trigger frame |
| CS required | 1 | Set to 1 to indicate that the STAs identified in the User Info fields are required to sense the medium and to consider the medium state and the NAV in determining whether or not to respond. The CS Required subfield is set to 0 to indicate that the STAs identified in the User Info fields are not required to consider the medium state or the NAV in determining whether or not to respond. |
| Bandwidth | 2 | indicates the bandwidth in the HE-SIG-A of the HE TB PPDU. E.g. 20 MHz, 40 MHz, 80 MHz, 80 + 80 MHz or 160 MHz |
| GI And LTF Type | 2 | indicates the GI and HE-LTF type of the HE TB PPDU response. |

The Trigger frame may include one or more User Info fields 115 addressed to the recipient STAs. For recipient STAs that are associated with the AP, the User Info field is addressed to a recipient STA if the value of the User Identifier subfield of the User Info field is equal to the AID of the STA.

The User Info field 115 may include at least one of following subfields in the Table 4.

TABLE 4

| Subfields | Bits | Description |
| --- | --- | --- |
| AID | 12 | indicates the AID of the STA allocated the resource unit (RU) to transmit the MPDU(s) in the HE TB PPDU, except for an AID equal to |

TABLE 4-continued

| Subfields | Bits | Description |
|---|---|---|
| | | 0 which identifies a wildcard RU for random access. |
| RU allocation | 8 | indicates the RU used by the HE TB PPDU of the STA identified by the User Identifier subfield. |
| Coding Type | | indicates the code type of the HE TB PPDU response of the STA identified by the User Identifier subfield. |
| MCS | | indicates the MCS of the HE TB PPDU response of the STA identified by the User Identifier subfield. |
| DCM | | indicates dual carrier modulation of the HE TB PPDU response of the STA identified by the User Identifier subfield. |
| Spatial Stream allocation | | indicates the spatial streams of the HE TB PPDU response of the STA identified by User Identifier field. |

Figure 12:
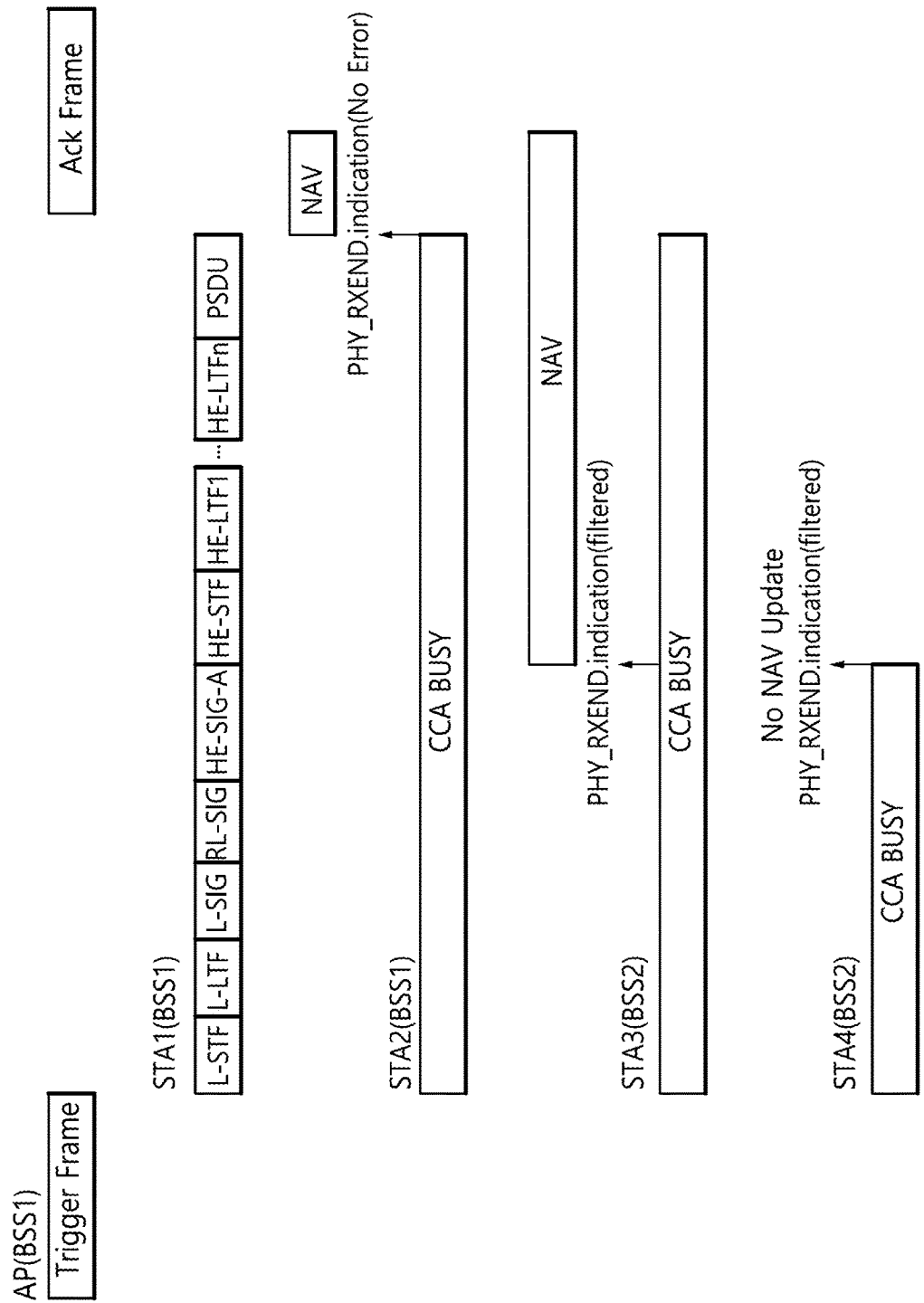
FIG. 12 shows the NAV procedure of HE STA after receiving HE TB PPDU.

FIG. 12 shows the NAV procedure of HE STA after receiving HE TB PPDU.

In a HE TB PPDU, TXTIME in the LENGTH parameter of L-SIG is set as $$TXTIME = T_{LEG\_PREAMBLE} + T_{L-SIG} + T_{RL-SIG} + T_{HE-SIG-A} + T_{HE\_PREAMBLE} + T_{SYM} \cdot N_{SYM} + T_{PE}.$$

In STA 2, because PHY-RXEND.indication primitive is occurred at the end of the PSDU, the NAV is set to either TXOP Duration value indicated in HE-SIG-A or Duration value indicated in MAC header.

In a case of STA 3, after decoding HE-SIG-A, it knows that the received PPDU is destined to OBSS STA. So, it discards the remaining PSDU. In consequence, PHY-RXEND.indication primitive is occurred after HE-SIG-A.

The NAV of STA 3 is set to TXOP Duration value plus the remaining time until the end of PSDU. The remaining time until the end of PSDU is equal to $$\left\lceil \frac{LENGTH + 3 + m}{3} \right\rceil 4 - T_{RL-SIG} - T_{HE-SIG-A}.$$

In STA 4, after decoding HE-SIG-A, it knows that the received PPDU is destined to OBSS STA. But, because the received signal strength is less than OBSS Packet Detection (OBSS PD) Threshold, it ignores the NAV update and resumes its backoff procedure.

Figure 13:
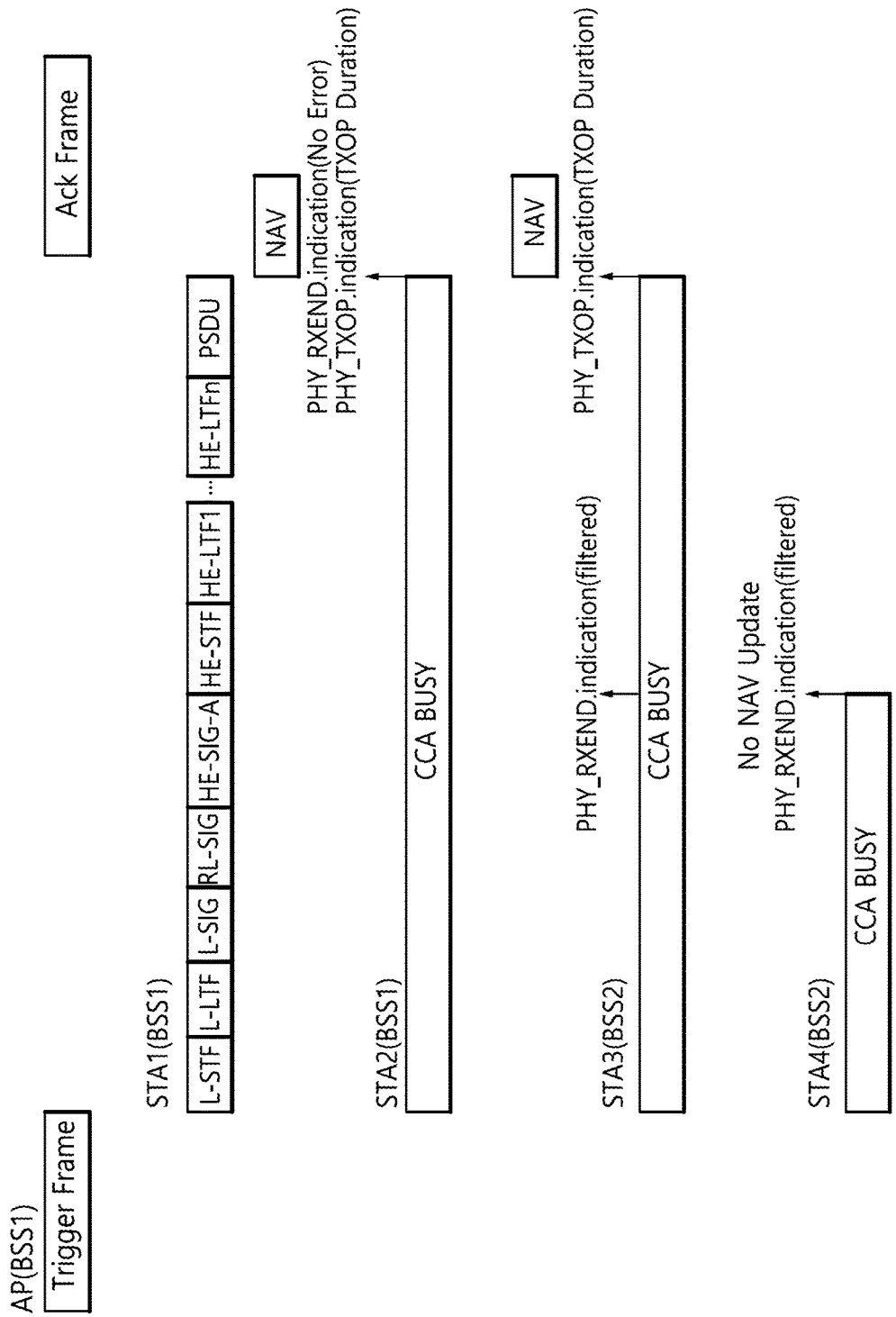
FIG. 13 shows the NAV procedure of HE STA after receiving HE TB PPDU.

FIG. 13 shows the NAV procedure of HE STA after receiving HE TB PPDU.

In a HE TB PPDU, TXTIME in the LENGTH parameter of L-SIG is set as $$TXTIME = T_{LEG\_PREAMBLE} + T_{L-SIG} + T_{RL-SIG} + T_{HE-SIG-A} + T_{HE\_PREAMBLE} + T_{SYM} \cdot N_{SYM} + T_{PE}.$$

In STA 2, because PHY-RXEND.indication primitive and PHY-TXOP.indication primitive are occurred at the end of the PSDU, the NAV is set to either TXOP Duration value indicated in HE-SIG-A or Duration value indicated in MAC header.

In a case of STA 3, after decoding HE-SIG-A, it knows that the received PPDU is destined to OBSS STA. So, it discards the remaining PSDU. In consequence, PHY-RXEND.indication primitive is occurred after HE-SIG-A for a power saving purpose. But, for a protection mechanism, PHY-TXOP.indication primitive is occurred at the end of the RXTIME. The NAV of STA 3 may be set to TXOP Duration value obtained from PHY-TXOP.indication primitive.

In STA 4, after decoding HE-SIG-A, it knows that the received PPDU is destined to OBSS STA. But, because the received signal strength is less than OBSS Packet Detection (OBSS PD) Threshold, it ignores the NAV update and resumes its backoff procedure. PHY-TXOP.indication primitive is not occurred or is occurred with RXVECTOR parameter TXOP_DURATION set to 0.

The energy-detect (ED) based CCA and virtual CS functions are used to determine the state of the medium if CS is required before responding to a received Trigger frame.

A NAV is considered in virtual CS for a STA that is solicited by a Trigger frame for transmission unless one of the following conditions is met:
  The response generated by the STA contains an Ack frame or a BlockAck frame and the Length subfield in the Common Info field of the Trigger frame is less than or equal to 418
  The NAV was set by an intra-BSS frame If one or both of the NAVs are considered and the considered NAV's counter is nonzero, then the virtual CS indicates busy. Otherwise, the virtual CS is idle.

If the CS Required subfield in a Trigger frame is set to 1, the STA shall consider the status of the CCA (using Energy Detect based on CCA sensitivity) and the virtual carrier sense before UL MU transmission in response to the Trigger frame. In this case, the STA shall sense the medium using ED after receiving the PPDU that contains the Trigger frame (i.e. during the SIFS time), and it shall perform the ED at least in the subchannel that contains the STA's UL allocation, where the sensed subchannel consists of either a single 20 MHz channel or multiple of 20 MHz channels. The STA may transmit an HE TB PPDU when the 20 MHz channels containing the allocated RUs in the Trigger frame are considered idle; if the STA detects that the 20 MHz channels containing the allocated RUs are not all idle, then the STA shall not transmit anything in the allocated RUs.

If the CS Required subfield in a Trigger frame is set to 0 or an UL MU response scheduling A-Control field is included in the received (A-)MPDU that solicits a response, the STA may respond with an HE trigger-based PPDU without regard to the busy/idle state of the medium.

The AP shall set the CS Required subfield to 1 except when one of the following conditions is met:
  All solicited HE TB PPDUs contain Ack or BlockAck frame and the Length subfield in the Common Info field of the Trigger frame is less than or equal to 418.
  All solicited HE TB PPDUs contain HE Compressed Beamforming And CQI frame (e.g., HE CQI-only Report) and the Length subfield in the Common Info field of the Trigger frame is less than or equal to 418.

When the AP requests the HE CQI-only Report, it transmits HE NDPA with Feedback Type field set to CQI only feedback. Then, it sequentially transmits HE NDP and the Beamforming Report Poll variant Trigger frame with the SIFS interval. Target recipient STAs responds with HE Compressed Beamforming And CQI frame containing the HE CQI-only Report.

The size of the HE CQI-only Report information is relatively small compared with other feedback types (SU or MU MIMO feedback) of the HE Compressed Beamforming feedback. For example, if the number of requested RUs is 9 and the number of requested space-time streams is 4, the size of the HE CQI-only Report information is only 27 bytes. So, when the AP requests the HE CQI-only Report by transmitting the HE NDPA with Feedback Type field set to CQI only feedback, the CS Required subfield in the Beamforming Report Poll variant Trigger frame shall be set to 0 if the Length subfield in the Common Info field of the Beamforming Report Poll variant Trigger frame is less than or equal to 418.

Transmission failure of a Trigger frame is defined as follows:

(1) The AP shall wait for a timeout interval of duration aSIFSTime+aSlotTime+aRxPHYStartDelay, starting when the MAC receives a PHY-TXEND.confirm primitive. If a PHYRXSTART.indication primitive does not occur during the timeout interval, the transmission of the Trigger has failed.

(2) If a PHY-RXSTART.indication primitive does occur during the timeout interval, the STA shall wait for the corresponding PHY-RXEND.indication primitive to recognize at least one valid response MPDU that either does not have a TA field or is sent by the recipient of the MPDU requiring a response. If anything else, including any other valid frame, is recognized, the transmission of the MPDU has failed.

After a valid response to the initial frame of a TXOP, if the Duration/ID field is set for multiple frame transmission and there is a subsequent transmission failure, the corresponding channel access function may transmit after the CS mechanism indicates that the medium is idle at the TxPIFS slot boundary provided that the duration of that transmission plus the duration of any expected acknowledgment and applicable IFS is less than the remaining TXNAV timer value. At the expiration of the TXNAV timer, if the channel access function has not regained access to the medium, then the EDCAF shall invoke the backoff procedure.

Figure 14:
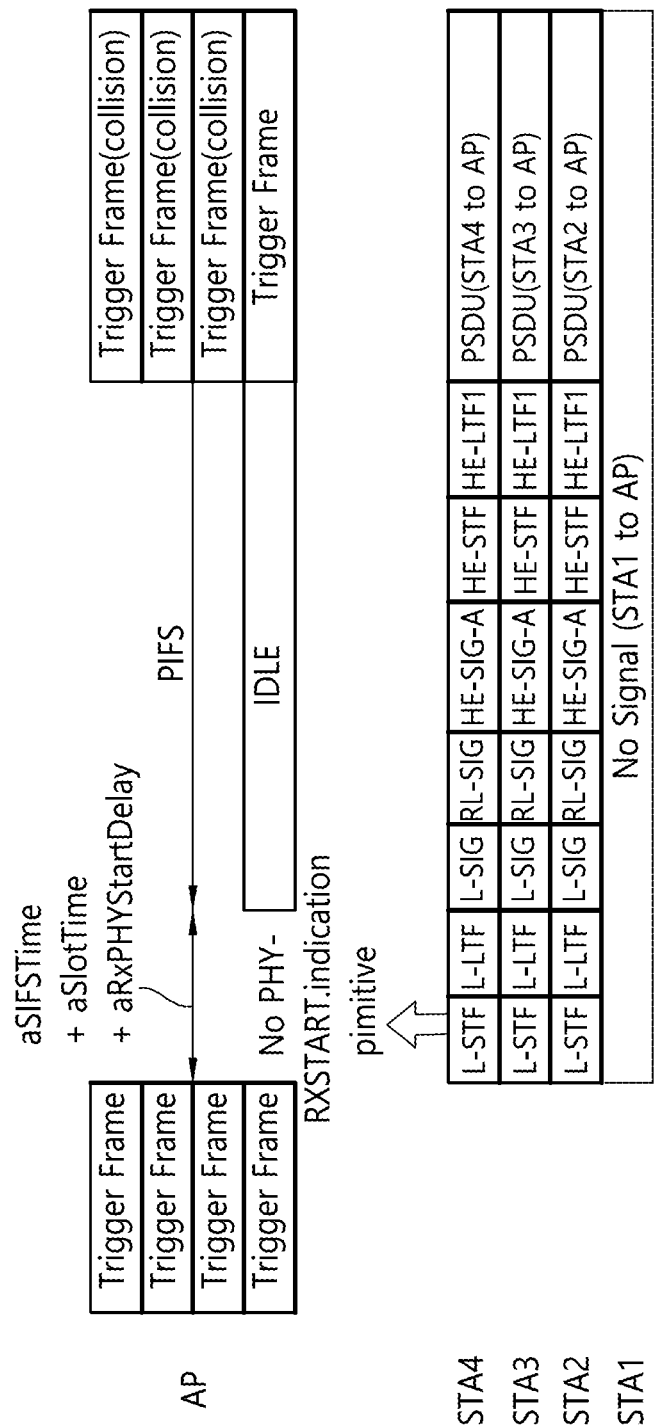
FIG. 14 shows an example when a transmission failure of a Trigger frame occurs.

FIG. 14 shows an example when a transmission failure of a Trigger frame occurs.

An AP transmits Trigger frames on the 80 MHz channel. As the response of the Trigger frames, STA2, STA3 and STA4 transmit HE trigger-based PPDUs in UL MU manner. But, because STA1 does not correctly receive the Trigger frame, it does not respond any frame. In such situation, when the PHY-RXSTART.indication primitive does not occur on the AP side, it is considered as a transmission failure. After the transmission failure, the AP transmits another Trigger frames on the 80 MHz channel after the CS mechanism on the primary channel indicates that the medium is idle at the TxPIFS slot boundary. However, as shown in the figure, STA2, STA3 and STA4 are already occupying the medium in a result of the transmission of the HE trigger-based PPDU. In consequence, the Trigger frames transmitted on the secondary channels might be collided with the ongoing transmissions of STA2, STA3 and STA4.

In order to solve this collision problem, it is proposes the following PIFS recovery mechanism for the multiple frame transmission in an EDCA TXOP.

After a valid response to the initial frame of a TXOP, if the Duration/ID field is set for multiple frame transmission and there is a subsequent transmission failure caused by the Trigger frame and HE trigger-based PPDU exchange sequence, the corresponding channel access function may transmit after the CS mechanism on the primary and secondary channels and STA shall perform exactly one of the following actions:

a) Transmit a 160 MHz or 80+80 MHz mask PPDU if the primary channel, the secondary channel, the secondary 40 MHz channel, and the secondary 80 MHz channel were idle at the TxPIFS slot boundary (or idle during an interval of PIFS).

b) Transmit an 80 MHz mask PPDU on the primary 80 MHz channel if the primary channel, the secondary channel and the secondary 40 MHz channel were idle at the TxPIFS slot boundary (or idle during an interval of PIFS).

c) Transmit a 40 MHz mask PPDU on the primary 40 MHz channel if both the primary channel and the secondary channel were idle at the TxPIFS slot boundary (or idle during an interval of PIFS).

d) Transmit a 20 MHz mask PPDU on the primary 20 MHz channel if the primary channel was idle at the TxPIFS slot boundary (or idle during an interval of PIFS).

Figure 15:
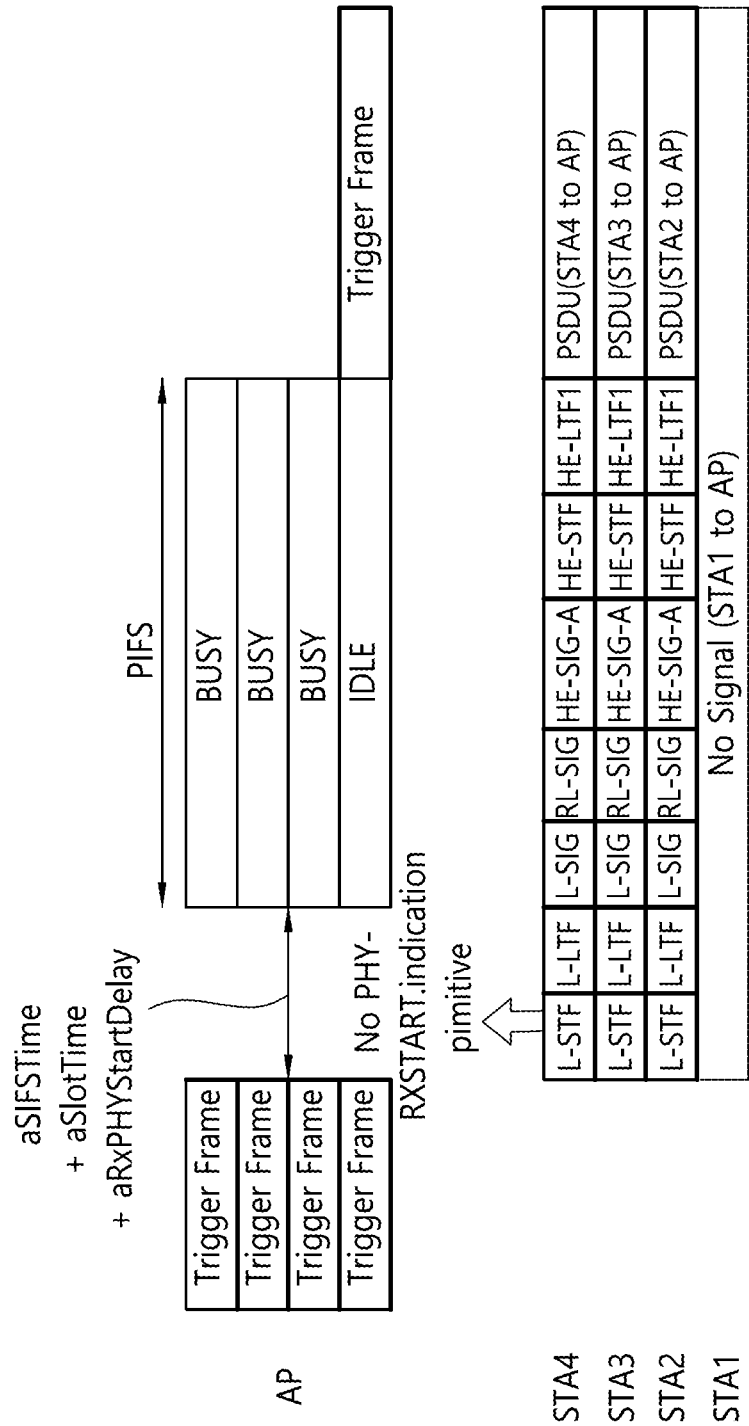
FIG. 15 shows an example when a transmission failure of a Trigger frame occurs.

FIG. 15 shows an example when a transmission failure of a Trigger frame occurs.

An AP transmits Trigger frames on the 80 MHz channel. As the response of the Trigger frames, STA2, STA3 and STA4 transmit HE trigger-based PPDUs in UL MU manner. But, because STA1 does not correctly receive the Trigger frame, it does not respond any frame. In such situation, when the PHY-RXSTART.indication primitive does not occur on the AP side, it is considered as a transmission failure. After the transmission failure, the AP transmits another Trigger frames on the 20 MHz channel after the CS mechanism on the primary channel and the secondary channels as proposed in this invention. The AP transmit a 20 MHz mask PPDU on the primary 20 MHz channel because the primary channel only was idle at the TxPIFS slot boundary (or idle during an interval of PIFS).

Figure 16:
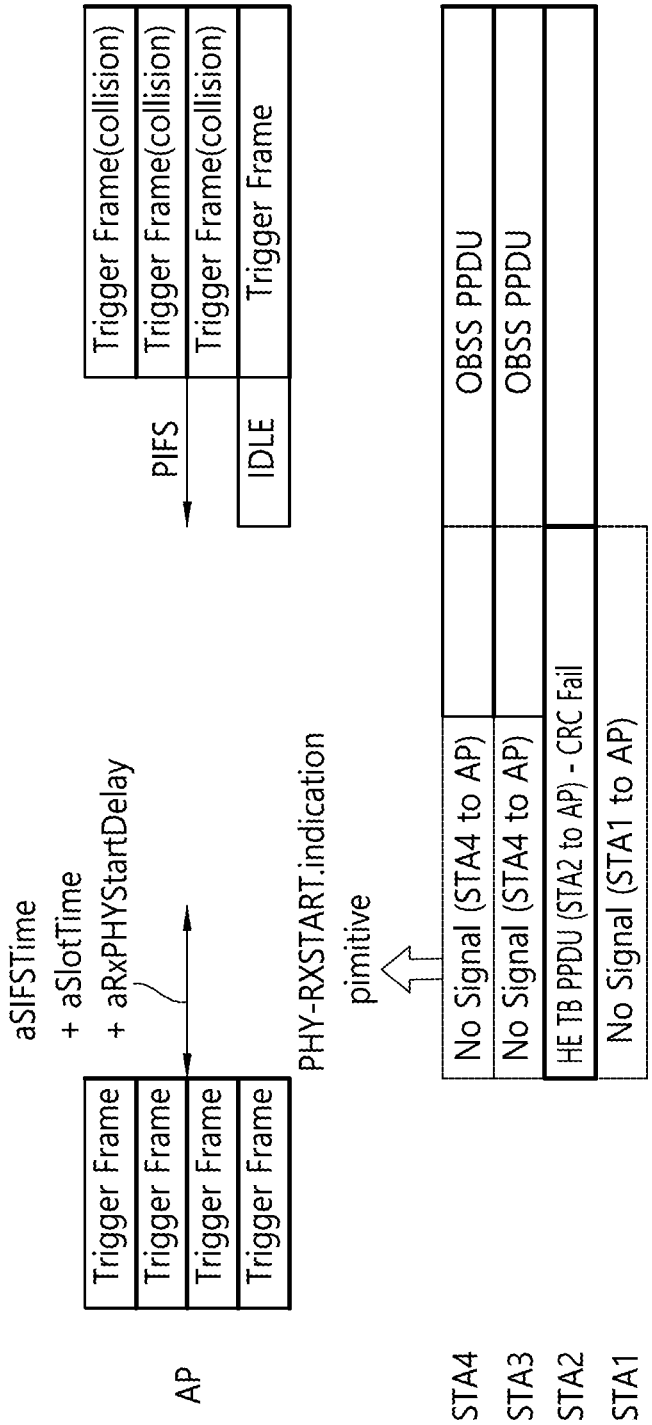
FIG. 16 shows an example when a transmission failure of a Trigger frame occurs.

FIG. 16 shows an example when a transmission failure of a Trigger frame occurs.

An AP transmits Trigger frames on the 80 MHz channel. As the response of the Trigger frames, STA2 transmit HE trigger-based PPDU in UL MU manner. But, because STA1, STA2 and STA3 do not correctly receive the Trigger frame, they do not respond any frame. In such situation, the PHY-RXSTART.indication primitive occurs on the AP side but the MAC FCS of the HE trigger-based PPDU received from STA2 is failed. It is also considered as a transmission failure. After the transmission failure, the AP transmits another Trigger frames on the 80 MHz channel after the CS mechanism on the primary channel indicates that the medium is idle at the TxPIFS slot boundary. However, as shown in the figure, OBSS PPDUs are already occupying the medium on the secondary channels. In consequence, the Trigger frames transmitted on the secondary channels might be collided with the ongoing OBSS transmissions.

Figure 17:
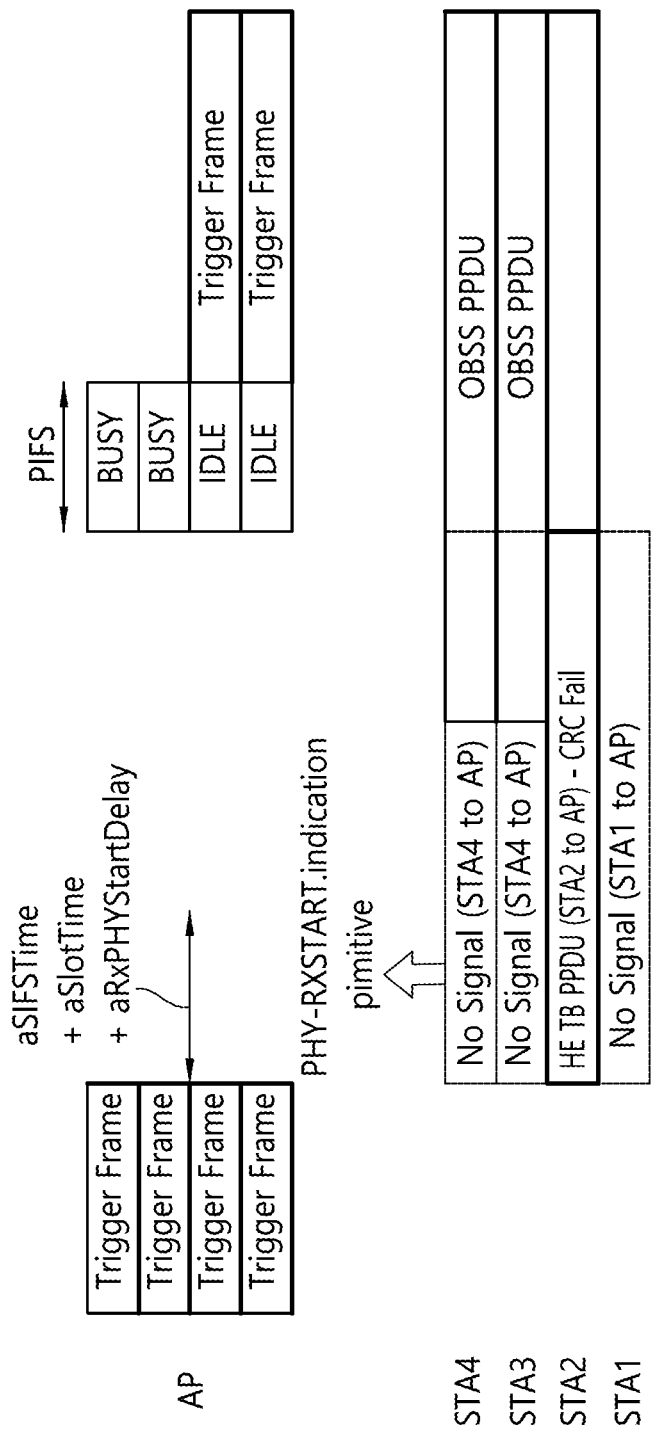
FIG. 17 shows an example when a transmission failure of a Trigger frame occurs.

FIG. 17 shows an example when a transmission failure of a Trigger frame occurs.

An AP transmits Trigger frames on the 80 MHz channel. As the response of the Trigger frames, STA2 transmit HE trigger-based PPDU in UL MU manner. But, because STA1, STA2 and STA3 do not correctly receive the Trigger frame, they do not respond any frame. In such situation, the PHY-RXSTART.indication primitive occurs on the AP side but the MAC FCS of the HE trigger-based PPDU received from STA2 is failed. It is also considered as a transmission failure. After the transmission failure, the AP transmits another Trigger frames on the 40 MHz channel after the CS mechanism on the primary channel and the secondary channels as proposed in this invention. The AP transmit a 20 MHz mask PPDU on the primary 20 MHz channel because the primary channel and the secondary channel were idle at the TxPIFS slot boundary (or idle during an interval of PIFS).

Figure 18:
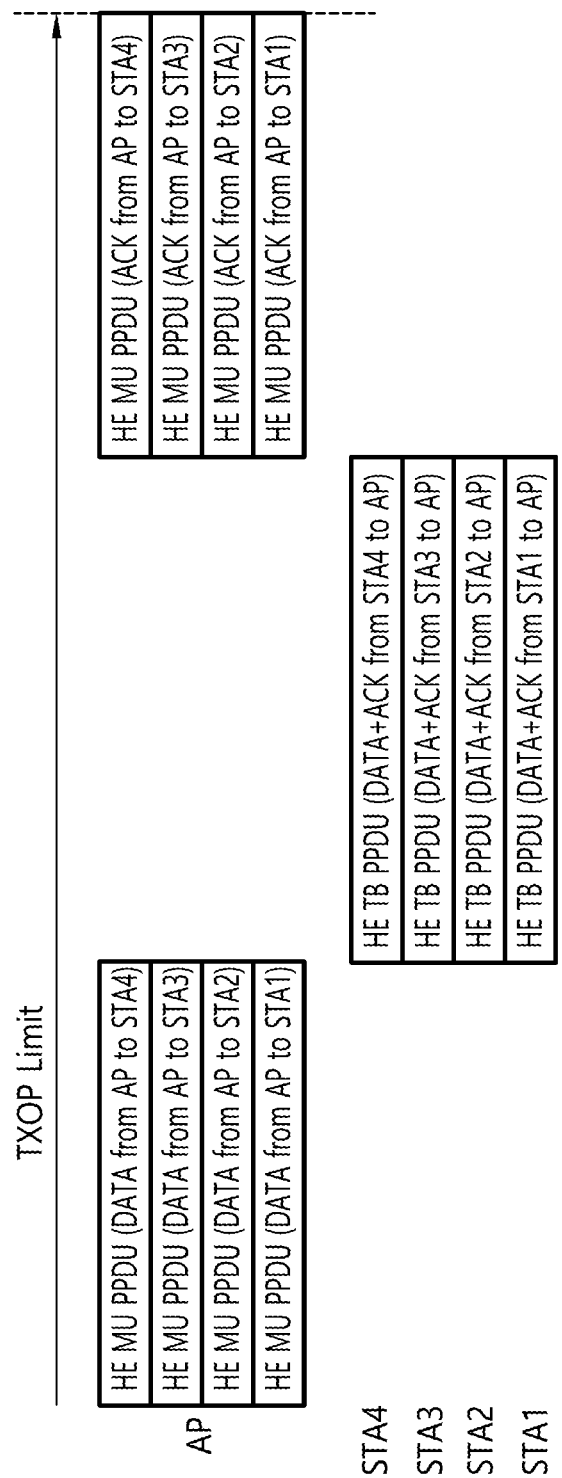
FIG. 18 shows an example of TXOP limit.

FIG. 18 shows an example of TXOP limit.

The duration of a TXOP is the time a STA obtaining a TXOP maintains uninterrupted control of the medium, and it includes the time required to transmit frames sent as an immediate response to TXOP holder transmissions. The TXOP holder shall ensure that the duration of a TXOP does not exceed the TXOP limit, when nonzero.

The TXOP limits are advertised by the AP in the EDCA Parameter Set element in Beacon and Probe Response frames transmitted by the AP.

An AP transmits Trigger frames on the 80 MHz channel. As the response of the Trigger frames, STA1, STA2, STA3 and STA4 transmit the HE trigger-based PPDUs in UL MU manner. If additional response frames from the AP do not exceed the TXOP limit, HE trigger-based PPDUs transmitted from the STAs can contain the DATA frame with the ACK Policy field set to an Implicit Block ACK Request. In the figure, the HE trigger-based PPDUs elicit the additional control response frames. As the response of the HE trigger-based PPDUs, AP transmits ACK frames to STA1, STA2, STA3 and STA4 in DL MU manner.

For this mechanism, the STA needs to determine whether eliciting the response frame does not exceed the TXOP limit. On this purpose, it is proposes the following HE TB PPDU context rule.

In the first embodiment, an HE TB PPDU does not elicit any response frame from the AP when the Duration field value in the MAC header of the immediately preceding frame is less than or equal to the pre-determined value, plus the TXTIME (transmission time) of the HE Trigger-based PPDU, plus two SIFSs. The response frame may include an ACK frame and/or a CTS frame.

In this HE TB PPDU context rule, an immediately preceding frame may contain either a Trigger frame or a frame having an UL MU response scheduling information in a MAC header. And, the pre-determined value may be set to either 0 or the Acknowledgement Transmission Time (AckTxTime) or the CF-END Transmission Time (CfEndTxTim). The AckTxTime is 44 microseconds (us) when an acknowledgment is ACK frame or 68 us when an acknowledgment is Block ACK frame. The CfEndTxTime is 52 us.

In the second embodiment, an HE TB PPDU does not elicit any response frame from the AP when the TXOP Duration value indicated in HE-SIG-A of the HE TB PPDU is less than or equal to the pre-determined value, plus one SIFS. The pre-determined value may be set to either 0 or the AckTxTime or the CfEndTxTime.

In the third embodiment, an HE TB PPDU does not elicit any response frame from the AP when the Duration field value in the MAC header of the HE TB PPDU is less than or equal to the pre-determined value, plus one SIFS. The pre-determined value may be set to either 0 or the AckTxTime or the CfEndTxTime.

Figure 19:
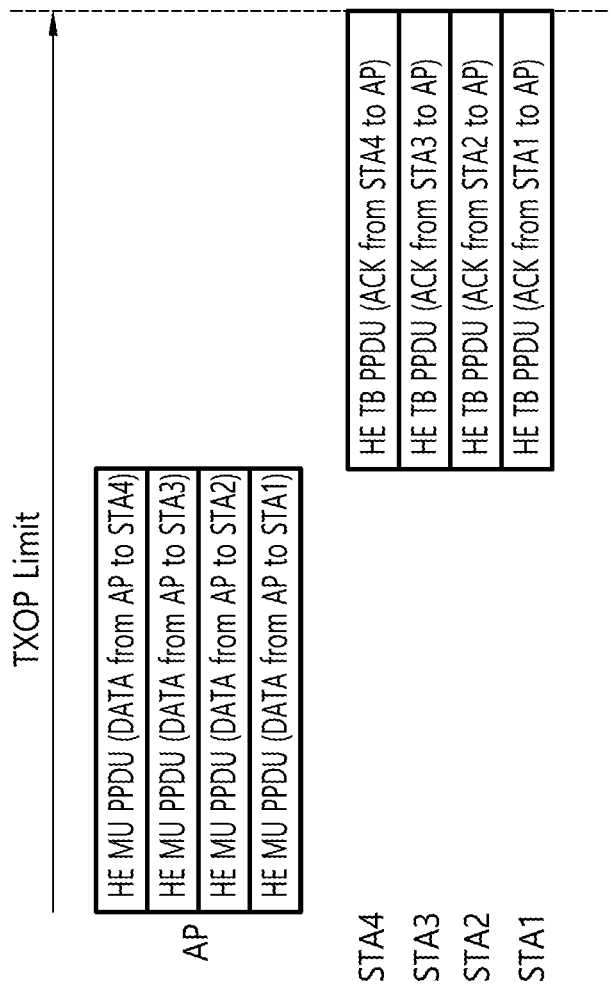
FIG. 19 shows an UL transmission according to an embodiment of the present invention.

FIG. 19 shows an UL transmission according to an embodiment of the present invention.

An AP transmits Trigger frames on the 80 MHz channel. As the response of the Trigger frames, STA1, STA2, STA3 and STA4 transmit the HE TB PPDUs in UL MU manner. The HE TB PPDUs do not elicit the additional control response frame because the Duration field in the MAC header of the immediately preceding frames (i.e., HE MU PPDU) is less than or equal to the pre-determined value, plus the TXTIME of the HE TB PPDU, plus two SIFSs.

Figure 20:
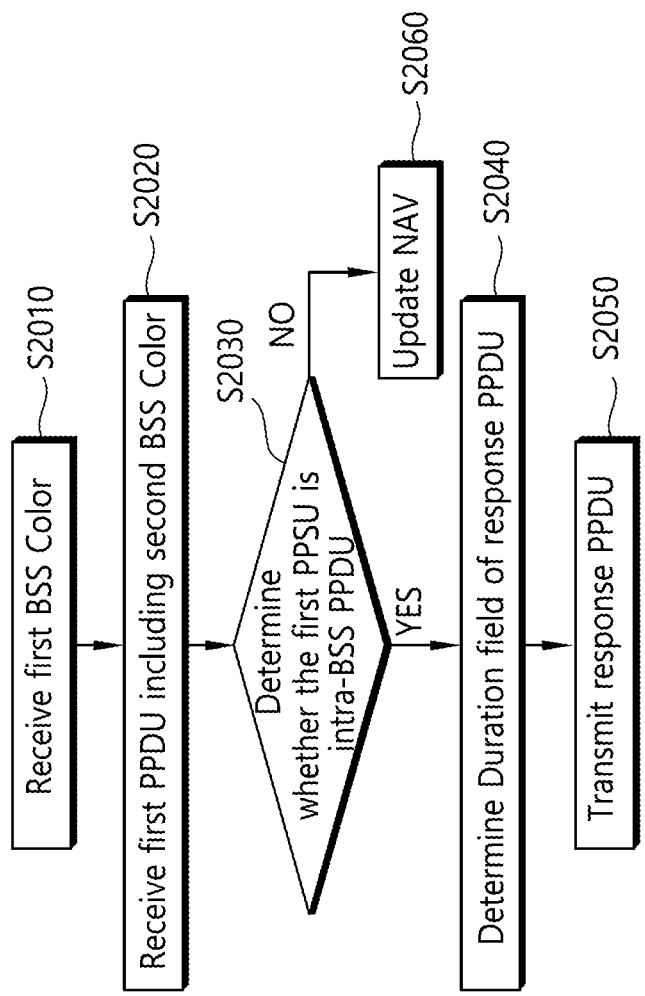
FIG. 20 shows a method for an UL transmission according to an embodiment of the present invention.

FIG. 20 shows a method for an UL transmission according to an embodiment of the present invention. This method may be performed by a STA.

In step S2010, a STA having a connection with an AP receives information about a first BSS color identifying a BSS managed by the AP. The information may be sent via a beacon frame.

In step S2020, the STA receives a first PPDU that includes a second BSS color in the HE-SIG-A field. The second BSS color identifies a BSS of an AP which sent the first PPDU.

In step S2030, the STA determines whether the first PPSU is an intra-BSS PPDU by comparing the first BSS color and the second BSS color. The intra-BSS PPDU is a PPDU transmitted by an AP associated with the STA. The inter-BSS PPDU is a PPDU transmitted by an AP not associated with the STA. When the first BSS color matches with the second BSS color, the first PPDU is an intra-BSS PPDU. When the first BSS color does not match with the second BSS color, the first PPDU is an inter-BSS PPDU.

An inter-BSS PPDU is a frame received by the STA if one of the following conditions is true:

The BSS color of the PPDU carrying the frame is not 0 and does not match the BSS color announced by the AP to which the STA is associated PARTIAL_AID of the received VHT PPDU frame with GROUP_ID equal to 0 is different from the BSSID[39: 47] of the AP to which the STA is associated The value of PARTIAL_AID [5:8] in the received VHT PPDU with GROUP_ID equal to 63 is different from the Partial BSS Color announced by the AP to which the STA is associated when the Partial BSS Color Indication field in the most recently received HE Operation element is equal to 1.

An HE AP receives either a VHT MU PPDU or an HE MU PPDU.

In step S2040, if the first PPDU is an intra-BSS PPDU and carries a Trigger frame, the STA determines a value of a Duration field of a response PPDU based on a Duration field of the first PPDU. The response PPDU does not include any frame that solicits a response frame (i.e. ACK frame) from the AP when the determined value of the Duration field is set to a predefined value. The predefined value may be zero. The response PPDU may include zero or more frame that solicits a response frame from the AP when the determined value of the Duration field is not set to zero.

In step S2050, the STA transmits the response PPDU.

In step S2060, if the first PPDU is an inter-BSS PPDU, the STA updates a NAV at an expected end of the first PPDU. The NAV may be updated based on a TXOP Duration field indicated by the HE-signal-A field of the first PPDU.

EIFS Protection

Figure 21:
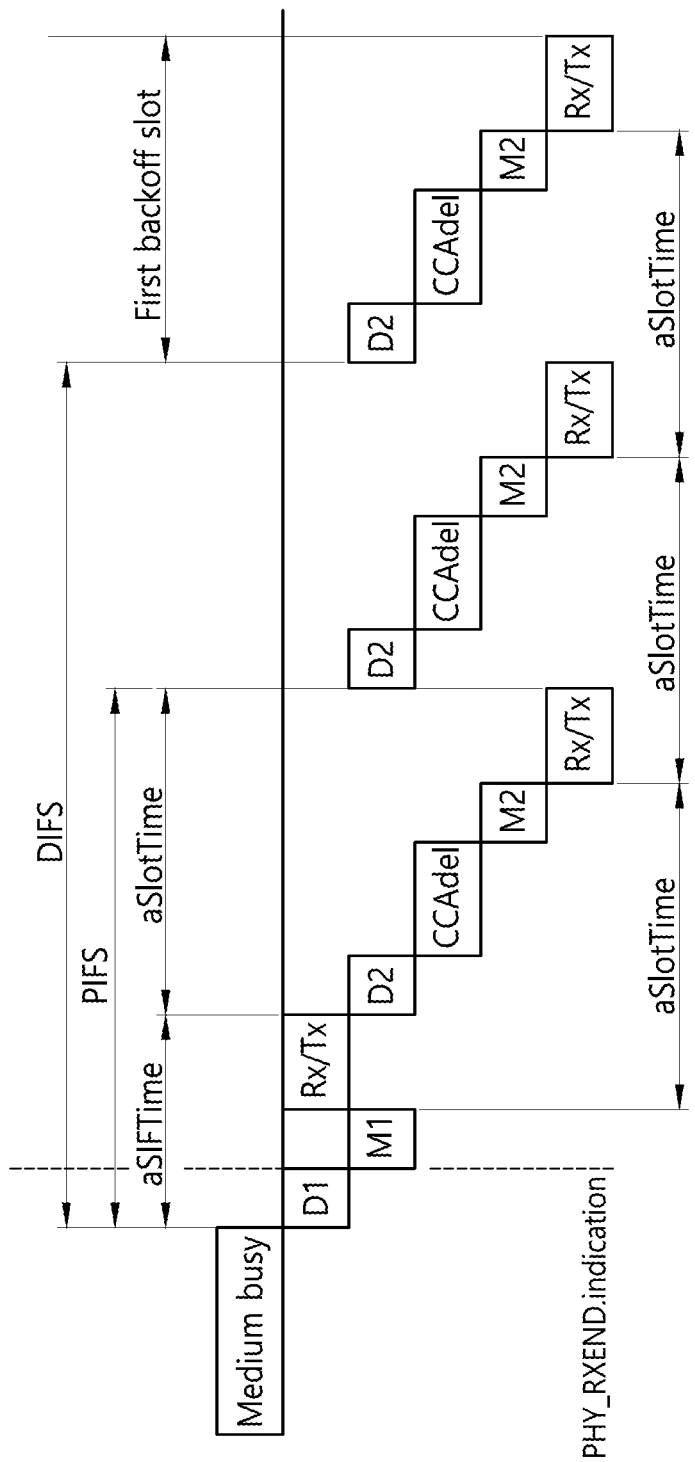
FIG. 21 shows various IFSs.

FIG. 21 shows various IFSs.

The time interval between frames is called an Inter-Frame Spacing (IFS). A point coordination function (PCF) interframe space (PIFS) is defined as PIFS=aSIFSTime+aSlotTime, and a distributed interframe space (DIFS) is defined as DIFS=aSIFSTime+2×aSlotTime, where aSIFSTime=aRxPHYDelay+aMACProcessingDelay+aRxTxTurnaroundTime, aSlotTime=aCCATime+aMACProcessingDelay+aRxTxTurnaroundTime+aAirPropagationTime.

A distributed coordination function (DCF) uses extended interframe space (EIFS) before transmission, when it determines that the medium is idle following reception of a frame for which the PHY-RXEND.indication primitive contained an error or a frame for which the FCS value was not correct. Similarly, a STA's EDCA mechanism under HCF shall use the EIFS−DIFS+AIFS[AC] interval. The EIFS or EIFS−DIFS+AIFS[AC] interval shall begin following indication by the PHY that the medium is idle after detection of the erroneous frame, without regard to the virtual CS mechanism. The STA shall not begin a transmission until the expiration of the later of the NAV and EIFS or EIFS−DIFS+AIFS[AC]. The EIFS and EIFS−DIFS+AIFS[AC] are defined to provide enough time for another STA to acknowledge what was, to this STA, an incorrectly received frame before this STA commences transmission. Reception of an error-free frame during the EIFS or EIFS−DIFS+AIFS[AC] resynchronizes the STA to the actual busy/idle state of the medium, so the EIFS or EIFS−DIFS+AIFS[AC] is terminated and medium access (using DIFS or AIFS as appropriate and, if necessary, backoff) continues following reception of that frame. At the expiration or termination of the EIFS or EIFS−DIFS+AIFS[AC], the STA reverts to the NAV and physical CS to control access to the medium.

When dot11DynamicEIFSActivated is false or not defined, the EIFS is derived from the SIFS and the DIFS and the length of time it takes to transmit an Ack frame at the lowest PHY mandatory rate by the following equation: EIFS=aSIFSTime+AckTxTime+DIFS, where AckTxTime is the time expressed in microseconds required to transmit an Ack frame, including preamble, PHY header and any additional PHY dependent information, at the lowest PHY mandatory rate.

When dot11DynamicEIFSActivated is true, EIFS is based on an estimated duration of the PPDU that is the possible response to the PPDU that causes the EIFS. When dot11DynamicEIFSActivated is true, if the PPDU that causes the EIFS does not contain a single MPDU with a length equal to 14 or 32 octets, then EIFS is determined as the following equation: EIFS=aSIFSTime+EstimatedAckTxTime+DIFS, where EstimatedAckTxTime is based on an estimated duration of the PPDU that is the possible response to the PPDU that causes the EIFS.

Figure 22:
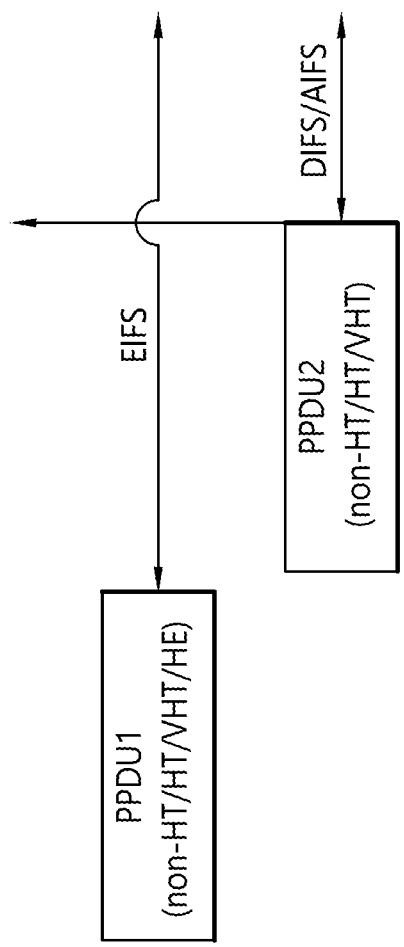
FIG. 22 shows an example of the EIFS termination rule.

FIG. 22 shows an example of the EIFS termination rule. EIFS is terminated at the timing of receiving the PHY-RXEND.indication primitive if a frame having a correct FCS is present in a PPDU2.

A reception of an error-free frame during the EIFS or EIFS−DIFS+AIFS[AC] resynchronizes the STA to the actual busy/idle state of the medium, so the EIFS or EIFS−DIFS+AIFS[AC] is terminated and medium access continues following reception of that frame. In here, an error-free frame means that the frame contained in a PSDU has a correct FCS.

Figure 23:
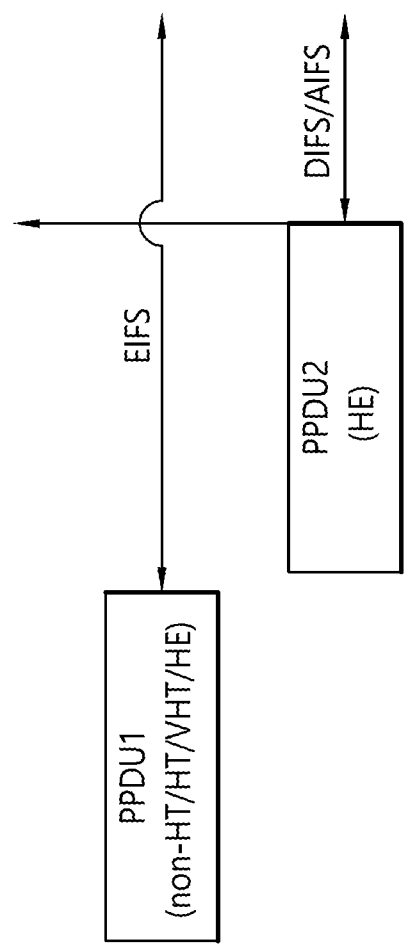
FIG. 23 shows another example of the EIFS termination rule.

But, when the received PPDU is the HE PPDU, the EIFS termination rule is revised as shown in the FIG. 23.

FIG. 23 shows another example of the EIFS termination rule. EIFS is terminated at the timing of receiving the PHY-RXEND.indication primitive if a frame having a correct FCS is present in a PPDU2 or a valid TXOP_DURATION parameter is present in the RXVECTOR of a PPDU2.

If a valid TXOP_DURATION parameter is present in the RXVECTOR of the received PPDU, the EIFS is terminated. In such case, the timing of the EIFS termination is the expected end of the received PPDU as shown on the following FIG. 24.

Figure 24:
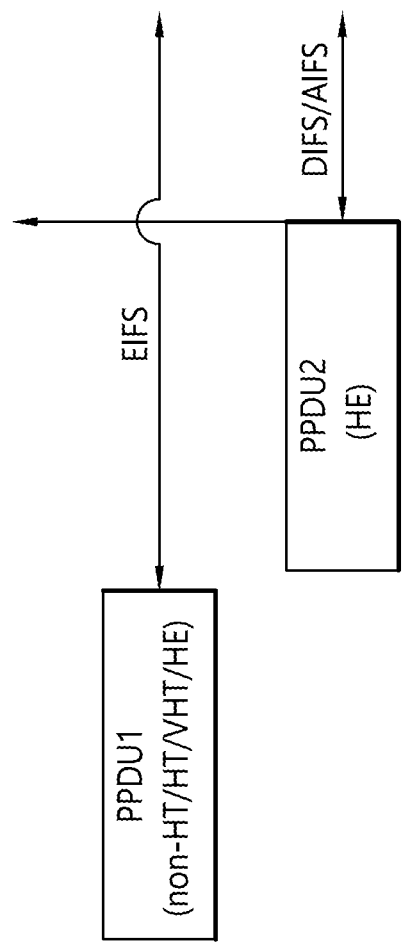
FIG. 24 shows still another example of the EIFS termination rule.

FIG. 24 shows still another example of the EIFS termination rule. When the PHY-RXEND.indication primitive is received before the end of the PPDU2, EIFS is terminated at the expected end of the PPDU2 if a frame having a correct FCS is present in a PPDU2 or a valid TXOP_DURATION parameter is present in the RXVECTOR of a PPDU2.

When the spatial reuse (SR) mechanism is used, the EIFS is not terminated if the above SR condition is met (even though a valid TXOP_DURATION parameter is present in the RXVECTOR of the received PPDU or a frame contained in a PSDU has a correct FCS).

Figure 25:
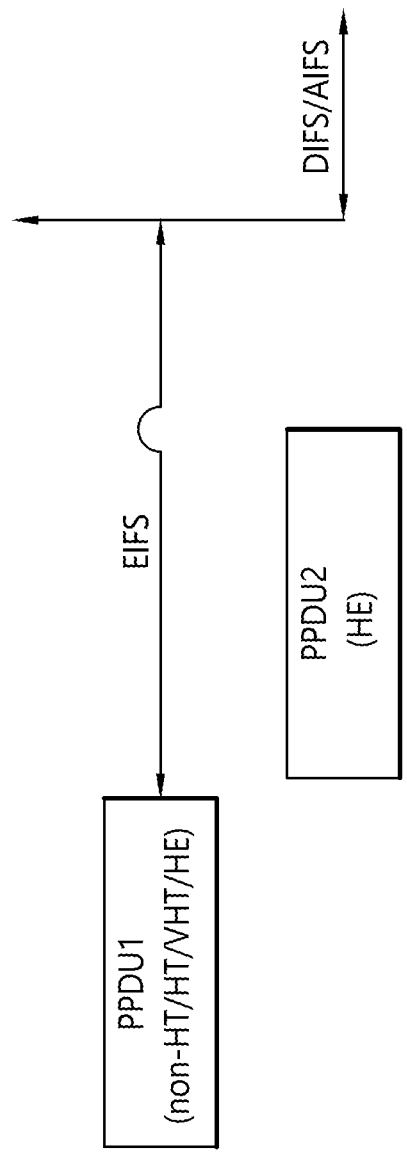
FIG. 25 shows the EIFS termination rule for the SR mechanism.

FIG. 25 shows the EIFS termination rule for the SR mechanism. EIFS is not terminated if the PPDU2 is an Inter-BSS PPDU and the received power level measured from the legacy portion of the PPDU2 is below the OBSS_PD level.

Spatial Reuse Channel Access Mechanism

An HE STA can use a spatial reuse (SR) mechanism for further improving a spectrum efficiency and an area throughput in a dense environment.

If a PHY-CCA.indication transition from IDLE to BUSY occurs followed by an RXSTART.indication due to a PPDU reception then the STA's MAC sublayer may a) issue a PHY-CCARESET.request primitive and b) not update its NAV timers based on frames carried in the PPDU and c) not invoke an EIFS if all the following conditions are met:

The received PPDU is an Inter-BSS PPDU

The received power level measured from the legacy portion of the PPDU is below the OBSS_PD level The PPDU is other than:

a non-HT PPDU that carries a public action frame where the frame is individually addressed and the frame's RA matches the receiving STA's MAC address a non-HT PPDU that carries a public action frame where the frame is group addressed The PHYCCARESET.request primitive shall be issued at the end of the PPDU if all the following conditions are met:

The PPDU is HE SU PPDU or HE extended range SU PPDU

The RXVECTOR parameter SPATIAL_REUSE of the PPDU is set to SR Delay entry

A STA that transmits an HE SU PPDU or HE extended range SU PPDU may set the TXVECTOR parameter SPATIAL_REUSE to SR_Delay entry only if a Trigger frame having the CS Required subfield of the Common Info field set to 1 is carried in the HE SU PPDU or HE ER SU PPDU.

If a Trigger frame having the CS Required subfield of the Common Info field set to 0 is carried in an HE SU PPDU or HE ER SU PPDU, a STA that transmits the HE SU PPDU or HE ER SU PPDU shall not set the TXVECTOR parameter SPATIAL_REUSE to SR_Delay entry.

If the PHYCCARESET.request primitive is issued before the end of the PPDU, and a TXOP is initiated within the duration of the PPDU, then the TXOP shall be limited to the duration of the PPDU if the PPDU is HE MU PPDU and the RXVECTOR parameter SPATIAL_REUSE indicates SR Restricted.

A STA that transmits an HE MU PPDU may set the TXVECTOR parameter SPATIAL_REUSE to SR_Restricted entry only if a Trigger frame having the CS Required subfield of the Common Info field set to 1 is carried in the HE MU PPDU.

If a Trigger frame having the CS Required subfield of the Common Info field set to 0 is carried in an HE MU PPDU, a STA that transmits the HE MU shall not set the TXVECTOR parameter SPATIAL_REUSE to SR_Restricted entry Even though a STA meets the above spatial reuse condition, if a PHY-CCA.indication was BUSY before receiving an RXSTART.indication then it shall not issue a PHY-CCARESET.request primitive and update its NAV timers based on frames. So the SR mechanism is not allowed.

Figure 26:
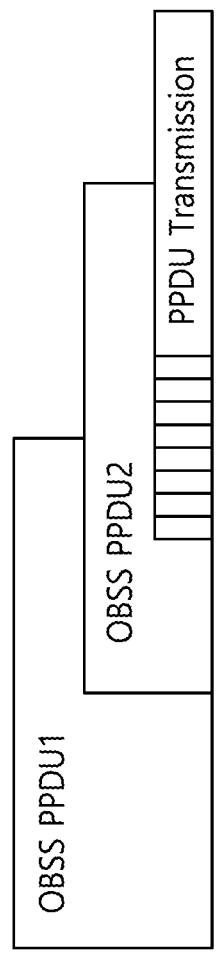
FIG. 26 shows an example of SR condition.

FIG. 26 shows an example of SR condition.

A STA does not meet the spatial reuse condition from the OBSS PPDU1 because the received power level measured from the legacy portion of the OBSS PPDU1 is not below the OBSS_PD level. Then, the STA receives the OBSS PPDU2 in a capture effect. But, the STA meets the spatial reuse condition from the OBSS PPDU2. In such case, the STA ignores the OBSS PPDU1's transmission then it can access the medium by continue a back-off procedure. It can make a non-intended interference signal to the OBSS PPDU1.

It is proposed that the spatial reuse mechanism is not allowed only when there is an ongoing PPDU transmission (indicated in the CCA BUSY) that does not pass the spatial reuse.

Figure 27:
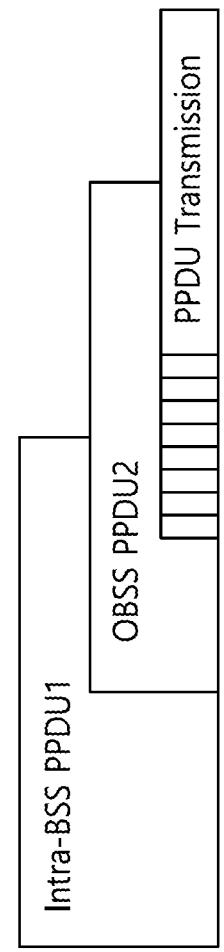
FIG. 27 shows an SR condition for Intra-BSS PPDU.

FIG. 27 shows an SR condition for Intra-BSS PPDU.

Figure 28:
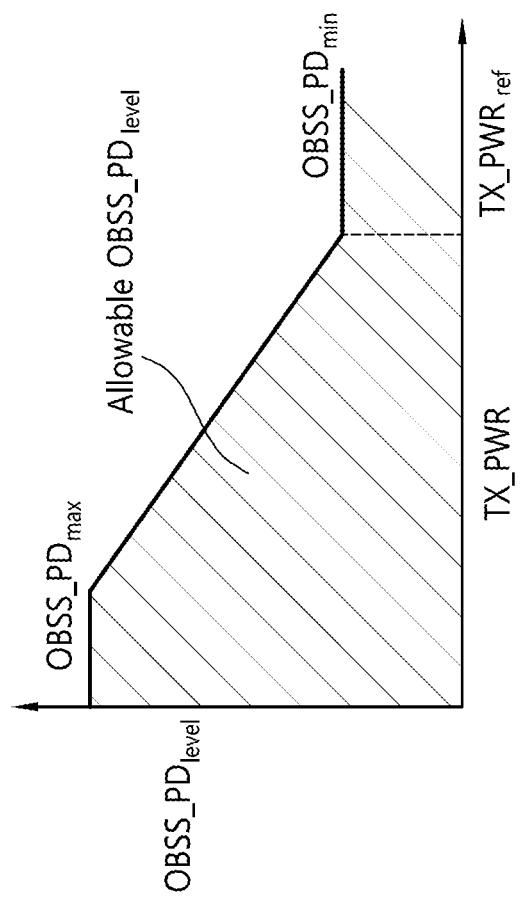
FIG. 28 shows an adjustment rules for OBSS_PD and TX_PWR.

FIG. 28 shows an adjustment rules for OBSS_PD and TX_PWR.

The OBSS_PD level is decided between the OBSS_PDmin and OBSS_PDmax. Adjusting OBSS_PD level and transmit power can improve the system level performance and the utilization of the spectrum. When using OBSS_PD-based spatial reuse, an HE STA is allowed to adjust the OBSS_PD level in conjunction with its transmit power based on the following adjustment rule:

Allowable $OBSS\_PD_{level} \leq \max\{OBSS\_PD_{min}, \min\{OBSS\_PD_{max}, OBSS\_PD_{min}+(TXPWR_{ref}-TXPWR)\}\}$ [Equation 2]

OBSS_PDmin_default=−82 dBm, and OBSS_PDmax_default=−62 dBm.

The OBSS_PDlevel is applicable to the start of a 20 MHz PPDU received on the primary 20 MHz. The OBSS_PDlevel (40 MHz) which is applicable to the start of a 40 MHz PPDU received on the primary 40 MHz, the OBSS_PDlevel (80 MHz) which is applicable to the start of a 80 MHz PPDU received on the primary 80 MHz and the OBSS_PDlevel (160 MHz or 80+80 MHz) which is applicable to the start of a 160 or 80+80 MHz PPDU received on the primary 160 or 80+80 MHz, can be derived by the following equations:

$OBSS\_PD_{level}(40\ MHz) = OBSS\_PD_{level} + 3\ dB$ $OBSS\_PD_{level}(80\ MHz) = OBSS\_PD_{level} + 6\ dB$ $OBSS\_PD_{level}(160\ MHz\ or\ 80+80\ MHz) = OBSS\_PD_{level} + 9\ dB$ [Equation 3]

TX_PWR is the STA's transmission power in dBm at the antenna connector. TX_PWRref is 21 dBm for non-AP STAs or for AP STAs with 1 and 2 spatial streams, 25 dBm for AP STAs of 3 spatial streams or more.

A STA can select an OBSS_PD level during its operation under SR mode. This level can be dynamically adjusted or can be static.

If a STA chooses a specific OBSS_PDlevel during its operation under SR mode, the allowable SR_maximum_transmit_power shall be calculated based on the following condition. If OBSS_PDlevel equals OBSS_PDmin, there are no additional constraints on the STA's SR_maximum_transmit_power. If OBSS_PDmax≥OBSS_PDlevel>OBSS_PDmin, the SR_maximum_transmit_power is equal to SR Maximum transmit power=TX_PWRref−(OBSS_PDlevel−OBSS_PDmin).

If a STA regards an inter-BSS PPDU as not having been received at all using a specific OBSS_PD level, the STA's power as measured at the output of the antenna connector, shall be equal or lower than the SR_maximum_transmit_power, calculated with this specific OBSS_PD level with the above equation, for the transmissions of any PPDU (including an HE TB PPDU when the HE TB PPDU is transmitted by a Trigger frame having the CS Required subfield of the Common Info field set to 1) until the end of the TXOP that the STA gains once its backoff reaches zero. STA may increase the OBSS_PD level during the backoff procedure, its maximum transmit power being adjusted as defined above.

Regarding above transmit power rule, an HE TB PPDU has additional constraints. If a STA regards an inter-BSS PPDU as not having been received at all using a specific OBSS_PD level, the STA's power as measured at the output of the antenna connector, shall be equal or lower than the SR_maximum_transmit_power, calculated with this specific OBSS_PD level with the above equation, for the transmissions of an HE trigger-based PPDU, if the HE trigger-based PPDU is triggered by either a Trigger frame having the CS Required subfield of the Common Info field set to 1 or a frame having the CS Required subfield of an UL MU response scheduling A-Control field set to 1. If the HE trigger-based PPDU is triggered by either a Trigger frame having the CS Required subfield of the Common Info field set to 0 or a frame having the CS Required subfield of an UL MU response scheduling A-Control field set to 0, the STA that regards an inter-BSS PPDU as not having been received at all using a specific OBSS_PD level does not follow the SR_maximum_transmit_power for determining the STA's transmit power. It means that the STA's power can be higher than the SR_maximum_transmit_power.

If a STA is permitted to begin a TXOP and the STA has at least one MSDU pending for transmission for the access category of the permitted TXOP, the STA shall perform exactly one of the following actions:

a) Transmit a 160 MHz or 80+80 MHz mask PPDU if the secondary channel, the secondary 40 MHz channel, and the secondary 80 MHz channel were idle during an interval of PIFS immediately preceding the start of the TXOP.

b) Transmit an 80 MHz mask PPDU on the primary 80 MHz channel if both the secondary channel and the secondary 40 MHz channel were idle during an interval of PIFS immediately preceding the start of the TXOP.

c) Transmit a 40 MHz mask PPDU on the primary 40 MHz channel if the secondary channel was idle during an interval of PIFS immediately preceding the start of the TXOP.

d) Transmit a 20 MHz mask PPDU on the primary 20 MHz channel.

e) Restart the channel access attempt by invoking the backoff procedure as though the medium is busy on the primary channel as indicated by either physical or virtual CS and the backoff timer has a value of 0.

Figure 29:
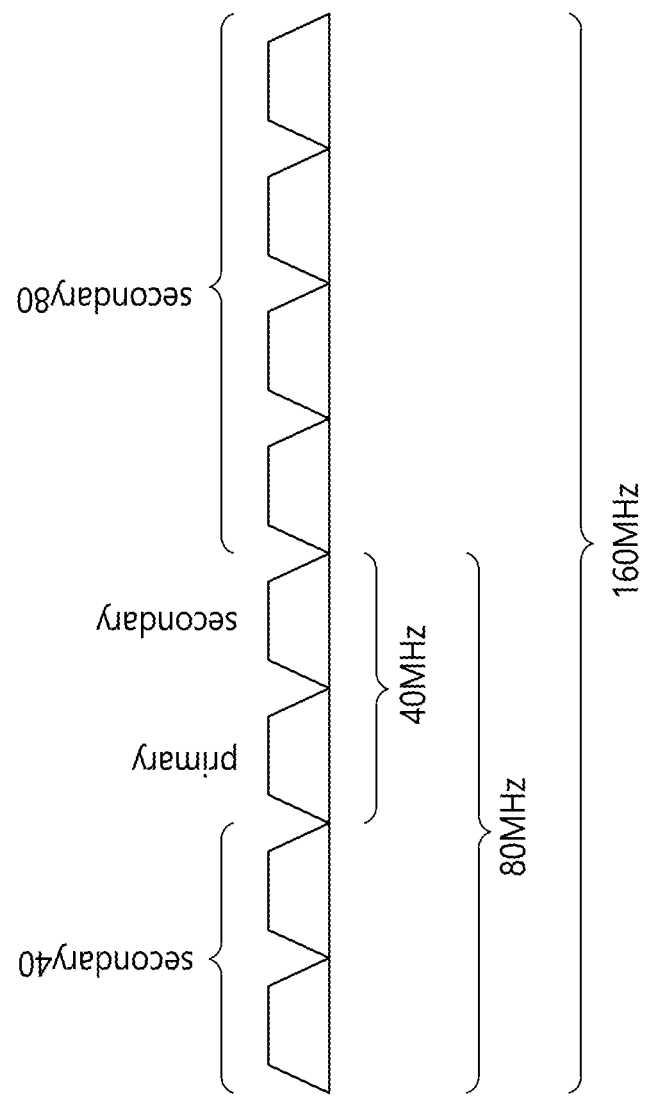
FIG. 29 shows the channel-list parameter element for 40 MHz, 80 MHz, and 160 MHz channel width.

FIG. 29 shows the channel-list parameter element for 40 MHz, 80 MHz, and 160 MHz channel width.

When the STA determines a channel bandwidth of the PPDU, the CCA status of the secondary channel, the secondary 40 MHz channel, and the secondary 80 MHz channel is determined as follows:

The PHY shall issue a PHY-CCA.indication(BUSY, {secondary}) primitive if the conditions for issuing PHY-CCA.indication(BUSY, {primary}) primitive are not present and one of the following conditions are present in an otherwise idle 40 MHz, 80 MHz, 160 MHz, or 80+80 MHz operating channel width:

Any signal within the secondary 20 MHz channel at or above a threshold of −62 dBm within a period of aCCATime after the signal arrives at the receiver's antenna(s); then the PHY shall not issue a PHY-CCA.indication(BUSY, {secondary40}), PHY-CCA.indication(BUSY,{secondary80}), or PHY-CCA.indication(IDLE) primitive while the threshold continues to be exceeded.

A 20 MHz NON_HT, HT_MF, HT_GF, VHT, HE PPDU detected in the secondary 20 MHz channel at or above −72 dBm with >90% probability within a period aCCAMidTime.

The PHY shall issue a PHY-CCA.indication(BUSY, {secondary40}) primitive if the conditions for issuing a PHY-CCA.indication(BUSY, {primary}) and PHY-CCA.indication(BUSY, {secondary}) primitive are not present and one of the following conditions are present in an otherwise idle 80 MHz, 160 MHz, or 80+80 MHz operating channel width:

Any signal within the secondary 40 MHz channel at or above a threshold of −59 dBm within a period of aCCATime after the signal arrives at the receiver's antenna(s); then the PHY shall not issue a PHY-CCA.indication(BUSY, {secondary80}) primitive or PHY-CCA.indication(IDLE) primitive while the threshold continues to be exceeded.

A 40 MHz non-HT duplicate, HT_MF, HT_GF, VHT or HE PPDU detected in the secondary 40 MHz channel at or above −72 dBm with >90% probability within a period aCCAMidTime.

A 20 MHz non-HT, HT_MF, HT_GF, VHT or HE PPDU detected in any 20 MHz sub-channel of the secondary 40 MHz channel at or above −72 dBm with >90% probability within a period aCCAMidTime.

The PHY shall issue a PHY-CCA.indication(BUSY, {secondary80}) primitive if the conditions for PHYCCA.indication(BUSY, {primary}), PHY-CCA.indication(BUSY, {secondary}), and PHYCCA.indication(BUSY, {secondary40}) primitive are not present and one of the following conditions are present in an otherwise idle 160 MHz or 80+80 MHz operating channel width:

Any signal within the secondary 80 MHz channel at or above −56 dBm.

An 80 MHz non-HT duplicate, VHT or HE PPDU detected in the secondary 80 MHz channel at or above −69 dBm with >90% probability within a period aCCAMidTime.

A 40 MHz non-HT duplicate, HT_MF, HT_GF, VHT or HE PPDU detected in any 40 MHz sub-channel of the secondary 80 MHz channel at or above −72 dBm with >90% probability within a period aCCAMidTime.

A 20 MHz NON_HT, HT_MF, HT_GF, VHT or HE PPDU detected in any 20 MHz sub-channel of the secondary 80 MHz channel at or above −72 dBm with >90% probability within a period aCCAMidTime.

aCCAMidTime is defined as following:

At 5 GHz, aCCAMidTime is equal to 25 us.

At 2.4 GHz, if the mid-packet CCA is used at the beginning of a TXOP, aCCAMidTime of a STA in which dot11ShortSlotTimeOptionImplemented is true is equal to 28 us. And, if the mid-packet CCA is used at the middle of a TXOP (for example, a PIFS recovery), aCCAMidTime of a STA in which dot11ShortSlotTimeOptionImplemented is true is equal to 19 us.

At 2.4 GHz, if the mid-packet CCA is used at the beginning of a TXOP, aCCAMidTime of a STA in which dot11ShortSlotTimeOptionImplemented is false is equal to 50 us. And, if the mid-packet CCA is used at the middle of a TXOP (for example, a PIFS recovery), aCCAMidTime of a STA in which dot11ShortSlotTimeOptionImplemented is false is equal to 30 us.

A STA in which dot11ShortSlotTimeOptionImplemented is true shall set the MAC variable aSlotTime to the short slot value upon transmission or reception of Beacon, Probe Response, Association Response, and Reassociation Response frames from the BSS that the STA has joined or started and that have the short slot subfield equal to 1.

The STA shall set the MAC variable aSlotTime to the long slot value upon transmission or reception of Beacon, Probe Response, Association Response, and Reassociation Response frames from the BSS that the STA has joined or started and that have the short slot subfield equal to 0.

A STA in which dot11ShortSlotTimeOptionImplemented is false shall set the MAC variable aSlotTime to the long slot value at all times.

A STA in which dot11ShortSlotTimeOptionImplemented is not present, or when the PHY supports only a single slot time value shall set the MAC variable aSlotTime to the slot value appropriate for the attached PHY.

When the OBSS_PD is not less than a CCA Mid Threshold (−72 dBm at 20 MHz and 40 MHz PPDU, −69 dBm at 80 MHz PPDU), for determining a channel bandwidth of the PPDU, the CCA status of the secondary channel, the secondary 40 MHz channel, and the secondary 80 MHz channel is following the following rules:

The PHY shall issue a PHY-CCA.indication(BUSY, {secondary}) primitive if the conditions for issuing PHY-CCA.indication(BUSY, {primary}) primitive are not present and one of the following conditions are present in an otherwise idle 40 MHz, 80 MHz, 160 MHz, or 80+80 MHz operating channel width:

Any signal within the secondary 20 MHz channel at or above a threshold of −62 dBm within a period of aCCATime after the signal arrives at the receiver's antenna(s); then the PHY shall not issue a PHY-CCA.indication(BUSY, {secondary40}), PHY-CCA.indication(BUSY, {secondary80}), or PHY-CCA.indication(IDLE) primitive while the threshold continues to be exceeded.

A 20 MHz NON_HT, HT_MF, HT_GF, VHT, HE PPDU detected in the secondary 20 MHz channel at or above the max{OBSS_PD, −72 dBm} with >90% probability within a period aCCAMidTime.

The PHY shall issue a PHY-CCA.indication(BUSY, {secondary40}) primitive if the conditions for issuing a PHY-CCA.indication(BUSY, {primary}) and PHY-CCA.indication(BUSY, {secondary}) primitive are not present and one of the following conditions are present in an otherwise idle 80 MHz, 160 MHz, or 80+80 MHz operating channel width:

Any signal within the secondary 40 MHz channel at or above a threshold of −59 dBm within a period of aCCATime after the signal arrives at the receiver's antenna(s); then the PHY shall not issue a PHY-CCA.indication(BUSY, {secondary80}) primitive or PHY-CCA.indication(IDLE) primitive while the threshold continues to be exceeded.

A 40 MHz non-HT duplicate, HT_MF, HT_GF, VHT or HE PPDU detected in the secondary 40 MHz channel at or above the max{OBSS_PD, −72 dBm} with >90% probability within a period aCCAMidTime.

A 20 MHz non-HT, HT_MF, HT_GF, VHT or HE PPDU detected in any 20 MHz sub-channel of the secondary 40 MHz channel at or above the max{OBSS_PD, −72 dBm} with >90% probability within a period aCCAMidTime.

The PHY shall issue a PHY-CCA.indication(BUSY, {secondary80}) primitive if the conditions for PHYCCA.indication(BUSY, {primary}), PHY-CCA.indication(BUSY, {secondary}), and PHYCCA.indication(BUSY, {secondary40}) primitive are not present and one of the following conditions are present in an otherwise idle 160 MHz or 80+80 MHz operating channel width:

Any signal within the secondary 80 MHz channel at or above −56 dBm.

An 80 MHz non-HT duplicate, VHT or HE PPDU detected in the secondary 80 MHz channel at or above the max{OBSS_PD, −69 dBm} with >90% probability within a period aCCAMidTime.

A 40 MHz non-HT duplicate, HT_MF, HT_GF, VHT or HE PPDU detected in any 40 MHz sub-channel of the secondary 80 MHz channel at or above the max{OBSS_PD, −72 dBm} with >90% probability within a period aCCAMidTime.

A 20 MHz NON_HT, HT_MF, HT_GF, VHT or HE PPDU detected in any 20 MHz sub-channel of the secondary 80 MHz channel at or above the max{OBSS_PD, −72 dBm} with >90% probability within a period aCCAMidTime.

An HE non-AP STA that is in intra-PPDU power save mode may enter the doze state until the end of a PPDU currently being received when one of the following conditions is met:

The PPDU is an HE MU PPDU where the RXVECTOR parameter BSS_COLOR is the BSS color of the BSS with which the STA is associated, the RXVECTOR parameter UL_FLAG is 0 and the RXVECTOR parameter STA_ID_LIST does not include the identifier of the STA or the broadcast identifier(s) intended for the STA.

The PPDU is an HE MU PPDU, HE SU PPDU or HE extended range SU PPDU and one of the following conditions are true:

The RXVECTOR parameter BSS_COLOR is the BSS color of the BSS with which the STA is associated and the RXVECTOR parameter UL_FLAG is 1

The RXVECTOR parameter BSS_COLOR is the BSS color of the BSS with which the STA is associated, the RXVECTOR parameter UL_FLAG is 0 and a PHY-RXEND.indication(UnsupportedRate) primitive was received The RXVECTOR parameter BSS_COLOR is not the BSS color of the BSS with which the STA is associated and the RXVECTOR parameters SPATIAL_REUSE is SR_Delay Entry The PPDU is an HE trigger-based PPDU and one of the following conditions are true:

The RXVECTOR parameter BSS COLOR is the BSS color of the BSS with which the STA is associated The PPDU is a VHT PPDU where the RXVECTOR parameter PARTIAL_AID is the BSSID[39:47] of the BSS with which the STA is associated and the RXVECTOR parameter GROUP_ID is 0.

The PPDU is a PPDU with:

An A-MPDU including TA or RA equal to either the BSSID of the BSS with which the STA is associated or the BSSID of any BSS of a multiple BSSID set that the STA's associated BSS belongs to and, The RA is not the MAC address of the STA An HE STA that is in intra-PPDU power save mode and has entered doze state shall continue to operate its NAV timers and consider the medium busy during doze state and shall transition into awake state at the end of the PPDU.

Spatial Reuse field is carried in the TXVECTOR parameter SPATIAL_REUSE of an HE PPDU and indicates spatial reuse information.

The 26-tone RU, 52-tone RU, 106-tone RU and 242-tone RU are used in the 20 MHz, 40 MHz, 80 MHz, 160 MHz and 80+80 MHz HE MU PPDU or HE TB PPD using OFDMA transmission. The 484-tone RU is used in the 40 MHz, 80 MHz, 160 MHz and 80+80 MHz HE MU PPDU or HE TB PPDU using OFDMA transmission. The 996-tone RU is used in the 80 MHz, 160 MHz and 80+80 MHz HE MU PPDU or HE TB PPDU using OFDMA transmission. The 2×996-tone RU is used in the 160 MHz and 80+80 MHz HE MU PPDU or HE TB PPDU using OFDMA transmission.

The 242-tone and larger RUs are used in the HE SU PPDU. The 242-tone RU is used in the 20 MHz HE SU PPDU. The 484-tone RU is used in the 40 MHz HE SU PPDU. The 996-tone RU is used in the 80 MHz HE SU PPDU. The 2×996-tone RU is used in the 160 MHz and 80+80 MHz HE SU PPDU.

The 26-tone RU, 52-tone RU, 106-tone RU and 242-tone RU are used in the 20 MHz, 40 MHz, 80 MHz, 160 MHz and 80+80 MHz HE MU PPDU or HE TB PPDU using OFDMA transmission, with the exception that if an HE AP operates in a DFS channel where there is non-HE OBSS, the HE AP shall not trigger any 26-tone RU and HE non-AP STA shall not respond with 26-tone RU in an HE TB PPDU in which HE data field is conveyed.

If a HE non-AP STA triggered by a Trigger frame with the CS Required subfield set to 0 does not respond with a 26-tone RU in HE TB PPDU in a DFS channel, then AP is advised to trigger 52-tone RU for the same HE non-AP STA in the next HE TB PPDU transmission.

Narrow band transmission like 26-tone RU can have impact on the behavior of a legacy AP who detects a radar signal in the DFS channel. It is possible that a radar detector may miss-detect the narrow band transmission as a radar signal.

If an HE AP supporting an HE MU PPDU operates in a DFS channel where there is non-HE OBSS, an HE non-AP STA shall not transmit an uplink HE MU PPDU with a 26-tone RU to the HE AP. On this purpose, an HE AP shall announce an HE Operation element with the 26-tone RU Disabled field set to 1 through a Beacon frame. When an HE non-AP STA receives an HE Operation element with the 26-tone RU Disabled field set to 1, the HE non-AP STA shall not transmit an uplink HE MU PPDU with a 26-tone RU to the HE AP. Also, when an HE non-AP STA detects non-HE OBSS, it shall not transmit an uplink HE MU PPDU with a 26-tone RU to an HE AP.

A frame other than a BlockAckReq or BlockAck that is carried in a non-HT PPDU shall be transmitted by the STA using a rate no higher than the highest rate in the BSSBasicRateSet parameter that is less than or equal to the rate or non-HT reference rate of the previously transmitted frame that was directed to the same receiving STA. If no rate in the BSSBasicRateSet parameter meets these conditions, the Control frame shall be transmitted at a rate no higher than the highest mandatory rate of the attached PHY that is less than or equal to the rate or non-HT reference rate of the previously transmitted frame that was directed to the same receiving STA.

To allow the transmitting STA to calculate the contents of the Duration field, a STA responding to a received frame transmits its control response frame at a primary rate, or at an alternate rate, or at an MCS, as specified by the following rules:

If a CTS or Ack frame is carried in a non-HT PPDU, the primary rate is defined to be the highest rate in the BSSBasicRateSet parameter that is less than or equal to the rate (or non-HT reference rate) of the previous frame. If no rate in the BSSBasicRateSet parameter meets these conditions, the primary rate is defined to be the highest mandatory rate of the attached PHY that is less than or equal to the rate (or non-HT reference rate) of the previous frame. The STA shall transmit the non-HT PPDU CTS or Ack frame at either the primary rate or the alternate rate, if one exists.

If a BlockAck frame is sent as an immediate response to either an implicit BlockAck request or to a BlockAck-Req frame that was carried in an HT or VHT PPDU or HE PPDU and the BlockAck frame is carried in a non-HT PPDU, the primary rate is defined to be the highest rate in the BSSBasicRateSet parameter that is less than or equal to the rate (or non-HT reference rate) of the previous frame. If no rate in the BSSBasicRateSet parameter meets these conditions, the primary rate is defined to be the highest mandatory rate of the attached PHY that is less than or equal to the rate (or non-HT reference rate) of the previous frame. The STA shall transmit the non-HT PPDU BlockAck frame at either the primary rate or the alternate rate, if one exists.

If a Basic BlockAck frame is sent as an immediate response to a BlockAckReq frame that was carried in a non-HT PPDU and the Basic BlockAck frame is carried in a non-HT PPDU, the primary rate is defined to be the same rate and modulation class as the BlockAckReq frame, and the STA shall transmit the Basic BlockAck frame at the primary rate.

If a Compressed BlockAck frame is sent as an immediate response to a BlockAckReq frame that was carried in a non-HT PPDU and the Compressed BlockAck frame is carried in a non-HT PPDU, the primary rate is defined to be the highest rate in the BSSBasicRateSet parameter that is less than or equal to the rate (or non-HT reference rate) of the previous frame. If no rate in the BSSBasicRateSet parameter meets these conditions, the primary rate is defined to be the highest mandatory rate of the attached PHY that is less than or equal to the rate (or non-HT reference rate) of the previous frame. The STA shall transmit the non-HT PPDU Compressed BlockAck frame at either the primary rate or the alternate rate, if one exists.

The following defines how to convert an HT MCS or a VHT-MCS or a HE-MCS (not using DCM) to a non-HT basic rate for the purpose of determining the rate of the response frame. It consists of two steps as follows:

a) Use the modulation and coding rate determined from the HT MCS or VHT-MCS or HE-MCS (not using DCM) to locate a non-HT reference rate.

b) The non-HT basic rate is the highest rate in the BSSBasicRateSet that is less than or equal to this non-HT reference rate.

Dual subcarrier modulation (DCM) is applied to an HE SU PPDU and an HE extended range SU PPDU. In an HE MU PPDU, DCM can be applied only to RUs containing data for 1 user. DCM is only applied to MCS0, MCS 1, MCS 3 and MCS 4. DCM is applied only with NSS=1 or NSS=2 (in the case of single user RU in an HE MU PPDU, NSS,r,u=1 or NSS,r,u=2). DCM is not applied with MU-MIMO or with STBC.

When DCM is employed, bit sequences are mapped to a pair symbols (dk, dq(k)) where k is in the range of 0<=k<=NSD−1 and Q(k) is in the range of NSD<=Q(k) <=2NSD−1 in order to exploit frequency diversity. (NSD represents the number of complex data numbers per frequency segment)

When the DCM (Dual Carrier Modulation) is used, the effective data rate is reduced to a half relative to the modulation and coding rate. So, the non-HT reference rate shall be compensated as the above table.

Figure 30:
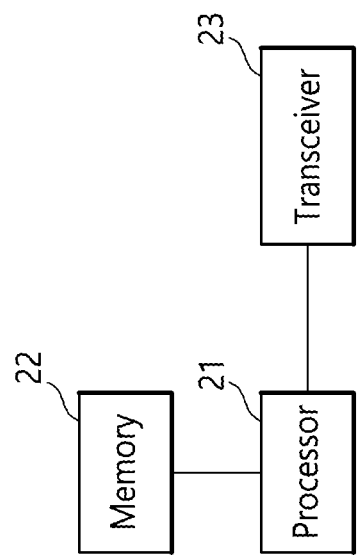
FIG. 30 shows a block diagram of a device to implement embodiments of the present invention.

FIG. 30 shows a block diagram of a device to implement embodiments of the present invention.

A device may include a processor 21, a memory 22, and a transceiver 23. The processor 21 implements an operation of the STA according to the embodiment of the present invention. The processor 21 may generate a PPDU according to an embodiment of the present invention and may instruct the transceiver 23 to transmit the PPDU. The memory 22 stores instructions for the operation of the processor 21. The stored instructions may be executed by the processor 21 and may be implemented to perform the aforementioned operation of the STA. The transceiver 23 transmits and receives a radio signal.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The transceiver may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for uplink transmission in a wireless local area network, the method comprising:
  establishing, by a station, a connection with an access point (AP);
  receiving, by the station, information about a first basic service set (BSS) color identifying a BSS managed by the AP;
  receiving, by the station, a first physical layer protocol data unit (PPDU), the first PPDU including a second BSS color and a first duration field;
  comparing, by the station, the first BSS color and the second BSS color to determine whether or not the received first PPDU is from the AP; and
  when the second BSS color matches with the first BSS color and the first PPDU requests a transmission of a second PPDU, transmitting, by the station, the second PPDU to the AP as a response to the first PPDU, the second PPDU including a second duration field,
  wherein the first duration field of the first PPDU indicates an estimated time required to transmit the second PPDU,
  wherein the second PPDU does not include any frame that solicits a control response frame to be sent by the AP when a value of the second duration field is set to zero, and
  wherein the control response frame includes an acknowledgement frame for acknowledging the second PPDU.

2. The method of claim 1, wherein the second PPDU includes at least one frame that solicits the control response frame to be sent by the AP when the value of the second duration field is not set to zero.

3. The method of claim 1, wherein the first PPDU includes a trigger frame for requesting the transmission of the second PPDU when the first BSS color is equal to the second BSS color, the trigger frame including a resource unit allocation and the first duration field, the resource unit allocation indicating at least one resource unit used for the transmission of the second PPDU.

4. The method of claim 3, wherein the trigger frame further includes information about a modulation and coding scheme for the second PPDU.

5. The method of claim 1, further comprising:
when the second BSS color does not match with the first BSS color, updating, by the station, a network allocation vector (NAV) at an end of the first PPDU.

6. The method of claim 5, wherein the first PPDU includes a legacy-short training field, a legacy long training field, a legacy-signal field, a repeated legacy-signal field and a high efficiency (HE)-signal-A field.

7. The method of claim 6, wherein the NAV is updated based on a value indicated by the HE-signal-A field.

8. A device for uplink transmission in a wireless local area network, the device comprising:
a transceiver configured to receive and transmit radio signals; and
a processor coupled with the transceiver and configured to:
control the transceiver to establish a connection with an access point (AP);
control the transceiver to receive information about a first basic service set (BSS) color identifying a BSS managed by the AP;
control the transceiver to receive a first physical layer protocol data unit (PPDU), the first PPDU including a second BSS color and a first duration field;
compare the first BSS color and the second BSS color to determine whether or not the received first PPDU is from the AP; and
control the transceiver to transmit a second PPDU to the AP as a response to the first PPDU when the second BSS color matches with the first BSS color and the first PPDU requests a transmission of the second PPDU, the second PPDU including a second duration field, wherein the first duration field of the first PPDU indicates an estimated time required to transmit the second PPDU,
wherein the second PPDU does not include any frame that solicits a control response frame to be sent by the AP when a value of the second duration field is set to zero, and
wherein the control response frame includes an acknowledgement frame for acknowledging the second PPDU.

9. The device of claim 8, wherein the second PPDU includes at least one frame that solicits the control response frame to be sent by the AP when the value of the second duration field is not set to zero.

10. The device of claim 8, wherein the first PPDU includes a trigger frame for requesting the transmission of the second PPDU when the first BSS color is equal to the second BSS color, the trigger frame including a resource unit allocation and the first duration field, the resource unit allocation indicating at least one resource unit used for the transmission of the second PPDU.

11. The device of claim 10, wherein the trigger frame further includes information about a modulation and coding scheme for the second PPDU.

12. The device of claim 9, further comprising:
when the second BSS color does not match with the first BSS color, updating, by the station, a network allocation vector (NAV) at an end of the first PPDU.

13. The device of claim 12, wherein the first PPDU includes a legacy-short training field, a legacy long training field, a legacy-signal field, a repeated legacy-signal field and a high efficiency (HE)-signal-A field.

14. The device of claim 13, wherein the NAV is updated based on a value indicated by the HE-signal-A field.

15. A method for uplink transmission in a wireless local area network, the method comprising:
receiving, by a station, a trigger frame for requesting a transmission of an uplink physical layer protocol data unit (PPDU) from an access point (AP), the trigger frame including a resource unit allocation and a first duration field, the resource unit allocation indicating at least one resource unit used for the transmission of the uplink PPDU, the first duration field indicating an estimated time required to transmit the uplink PPDU; and
transmitting, by the station, the uplink PPDU to the AP as a response to the trigger frame, the uplink PPDU including a second duration field,
wherein the uplink PPDU does not include any frame that solicits a control response frame to be sent by the AP when a value of the second duration field is set to zero, and
wherein the control response frame includes an acknowledgement frame for acknowledging the uplink PPDU.

16. The method of claim 15, wherein the trigger frame further includes information about a modulation and coding scheme for the uplink PPDU.

17. The method of claim 15, wherein the uplink PPDU includes a legacy-short training field, a legacy long training field, a legacy-signal field, a repeated legacy-signal field, a high efficiency (HE)-signal field.

* * * * *